(12) United States Patent
Iacovelli

(10) Patent No.: US 7,488,547 B1
(45) Date of Patent: Feb. 10, 2009

(54) FUEL CELL, COMPONENTS AND SYSTEMS

(76) Inventor: Benedetto Anthony Iacovelli, 117 Jones Rd., Leicester, NC (US) 28748

( * ) Notice: Subject to any disclaimer, the term of this patent is extended or adjusted under 35 U.S.C. 154(b) by 0 days.

(21) Appl. No.: 10/553,922

(22) PCT Filed: Apr. 22, 2004

(86) PCT No.: PCT/US2004/012635

§ 371 (c)(1),
(2), (4) Date: Jun. 7, 2007

(87) PCT Pub. No.: WO2004/095605

PCT Pub. Date: Nov. 4, 2004

Related U.S. Application Data

(60) Provisional application No. 60/500,123, filed on Sep. 3, 2003, provisional application No. 60/464,874, filed on Apr. 22, 2003.

(51) Int. Cl.
*H01M 8/00* (2006.01)
*H01M 4/86* (2006.01)
*H01M 4/92* (2006.01)

(52) U.S. Cl. ............... 429/13; 429/15; 429/38; 429/41; 429/44; 429/45

(58) Field of Classification Search ............ 429/13, 429/15, 38, 40, 41, 42, 43, 44, 45
See application file for complete search history.

(56) References Cited

U.S. PATENT DOCUMENTS 4,522,895 A * 6/1985 Shigeta et al. ............... 429/44

(Continued)

FOREIGN PATENT DOCUMENTS

DE     199 02 970 A1     7/2000

(Continued)

OTHER PUBLICATIONS

V. A. Tracey, "Production Of Porous Nickel For Alkaline-Battery And Fuel-Cell Electrodes: Practical And Economic Considerations", *Powder Metallurgy*, vol. 8, No. 16, pp. 241-253 (1965), (no month).

(Continued)

*Primary Examiner*—Stephen J. Kalafut
(74) *Attorney, Agent, or Firm*—The Eclipse Group LLP; David P. Gloekler

(57) ABSTRACT

Alkali fuel cells, systems, and related methods, and flow-through, high-surface area electrodes, are employed to generate electricity. The electrode can include a porous substrate comprising a first side for fluid ingress, a second side for fluid egress, and a plurality of walls oriented in different directions between the first and second sides, with voids defined between the walls, which can include surfaces and micro-scale pores. A thin film comprising a catalytic material can be disposed on the surfaces. A fuel/electrolyte mixture can be flowable generally from the first side, through the voids and the pores of the substrate and in contact with the thin film, and to the second side. Additives can be included for refreshing the electrolyte and/or the electrode. A water/thermal/pressure management system includes a permeable membrane from which water can be removed from a fluid while retaining fuel and/or electrolyte in the fluid. The electrolyte can include an additive that cleans the electrodes. A refresh cycle can be implemented in which one or more electrodes are operated in a mode that refreshes catalytic material of the electrode.

109 Claims, 17 Drawing Sheets

U.S. PATENT DOCUMENTS

| | | | |
|---|---|---|---|
| 4,529,670 A | 7/1985 | Findl | 429/38 |
| 4,783,381 A * | 11/1988 | Tytgat et al. | 429/15 |
| 5,023,150 A * | 6/1991 | Takabayashi | 429/22 |
| 5,185,218 A * | 2/1993 | Brokman et al. | 429/41 X |
| 5,364,711 A | 11/1994 | Yamada et al. | 429/15 |
| 6,322,915 B1 * | 11/2001 | Collins et al. | 429/13 |
| 6,329,089 B1 * | 12/2001 | Roberts et al. | 429/13 |
| 6,365,291 B1 * | 4/2002 | Margiott | 429/25 |
| 6,720,105 B2 | 4/2004 | Ohlsen et al. | 429/41 |
| 6,727,015 B1 | 4/2004 | Pütter et al. | 429/34 |
| 7,070,879 B2 * | 7/2006 | Mardilovich et al. | 429/44 |
| 2002/0028372 A1 | 3/2002 | Ohlsen et al. | 429/40 |
| 2003/0194598 A1 | 10/2003 | Chan | 429/40 |

FOREIGN PATENT DOCUMENTS

| | | | |
|---|---|---|---|
| EP | 1 093 176 A2 | 4/2001 | |

OTHER PUBLICATIONS

Supplementary European Search Report From Corresponding European Application No. 04 750 568.0, Oct. 16, 2008 (7 pgs.).

* cited by examiner

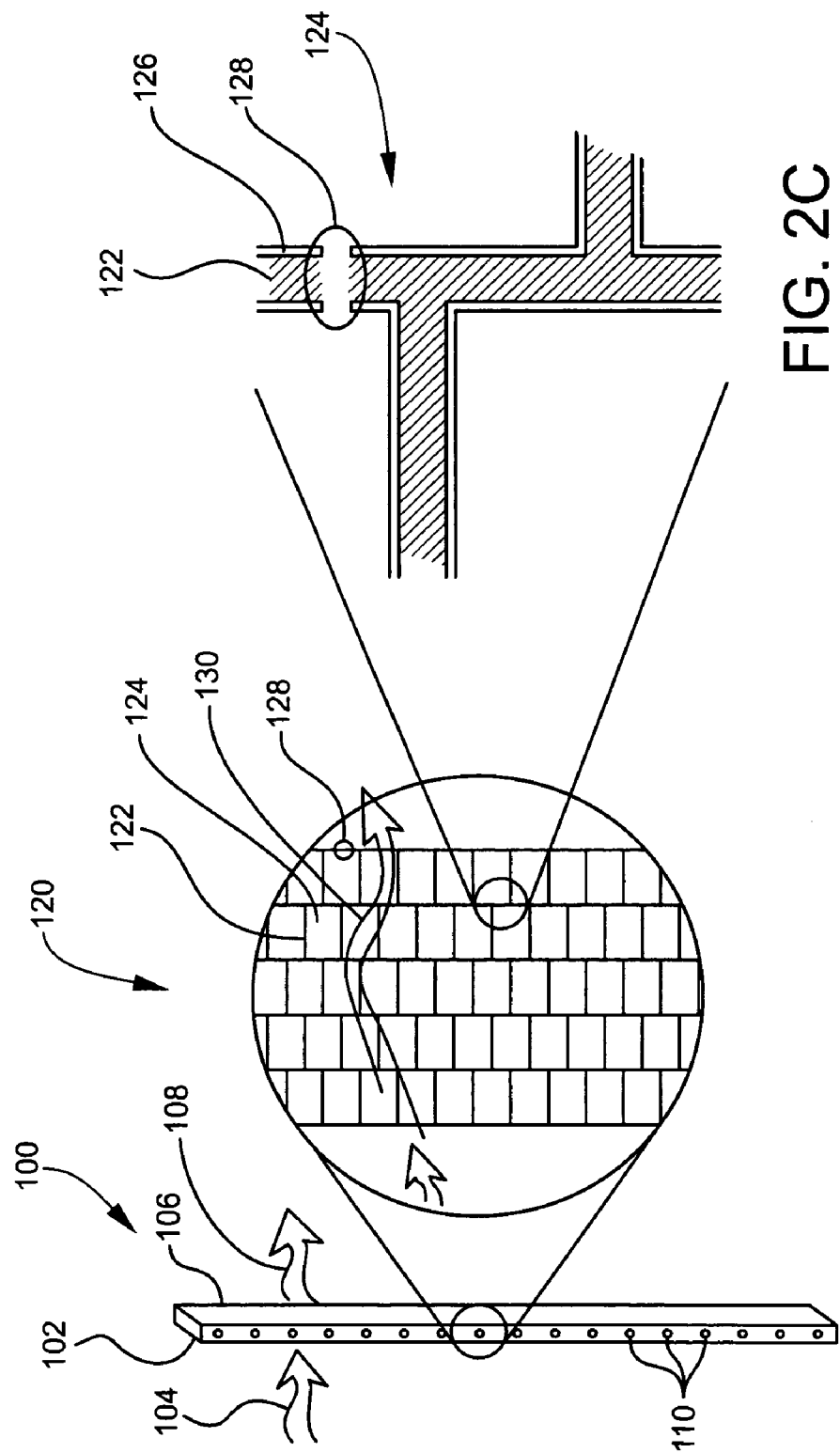

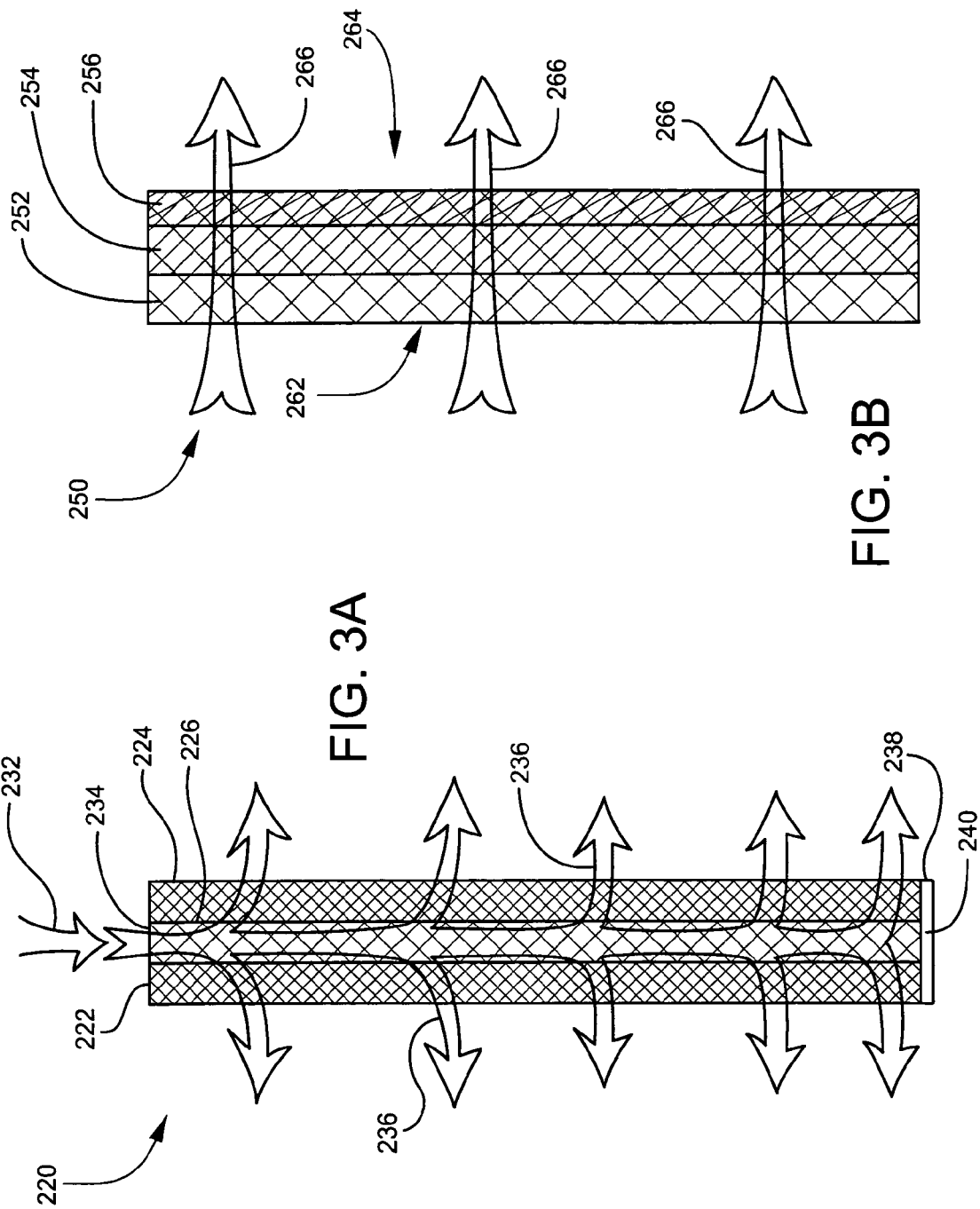

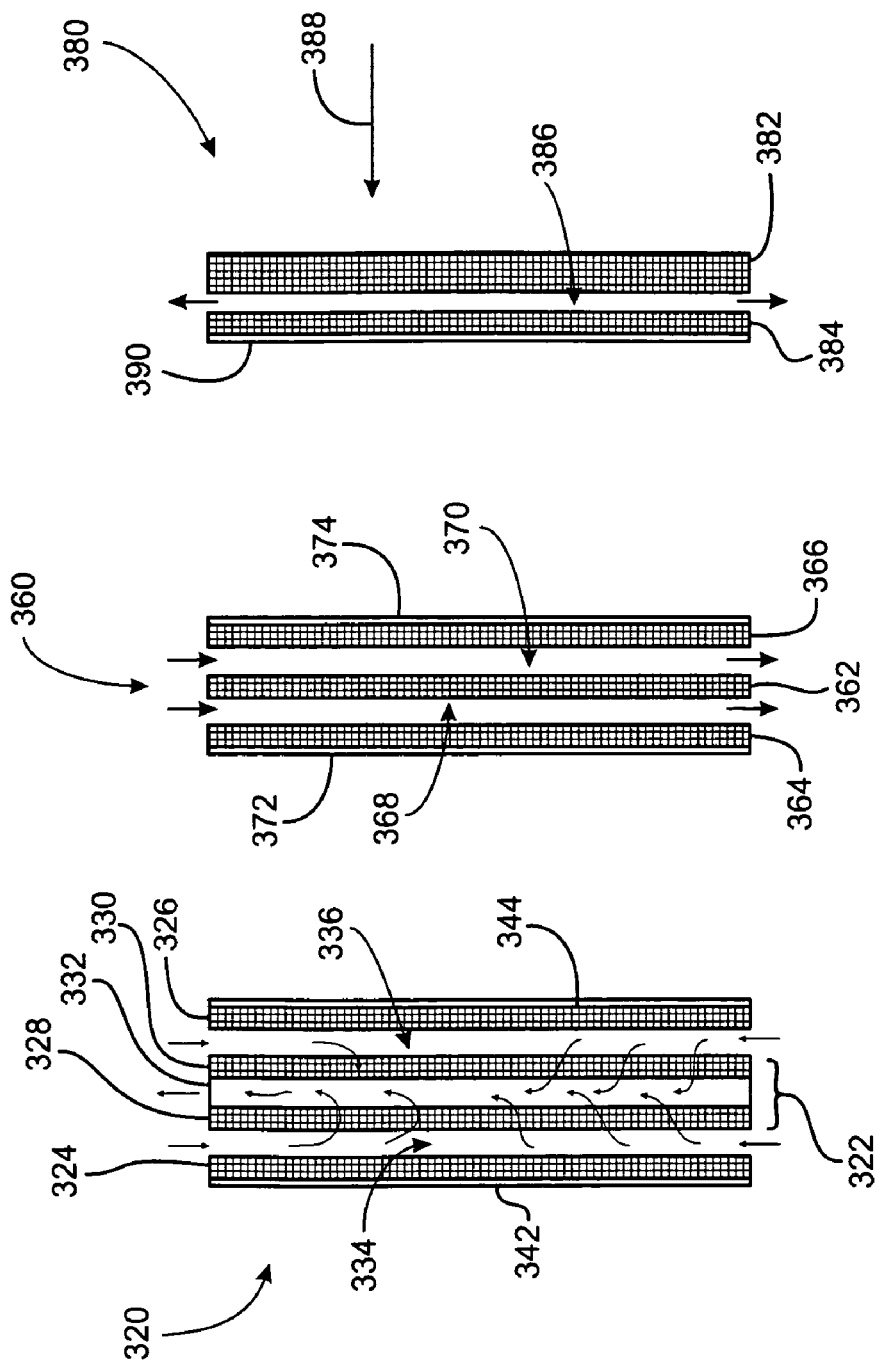

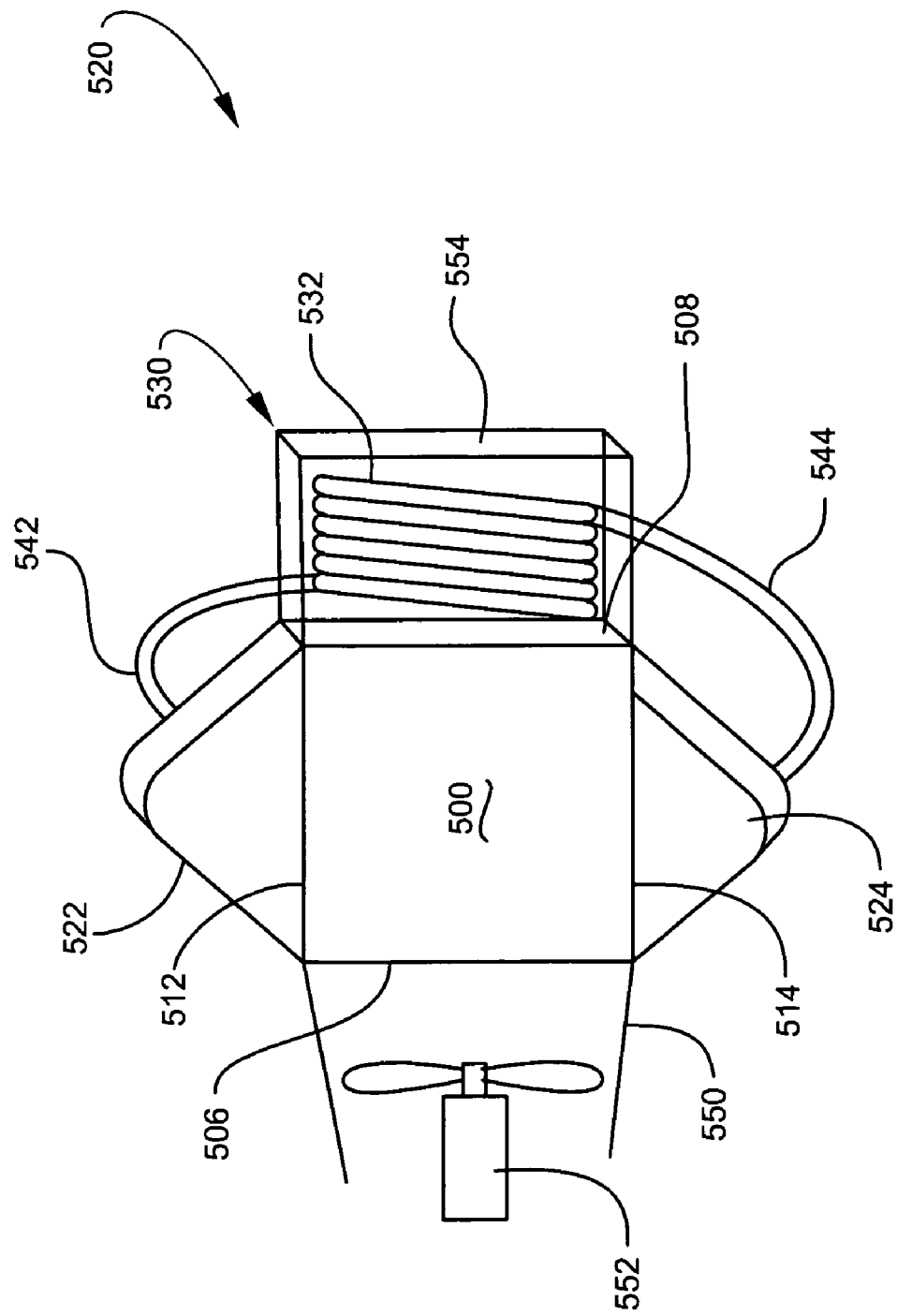

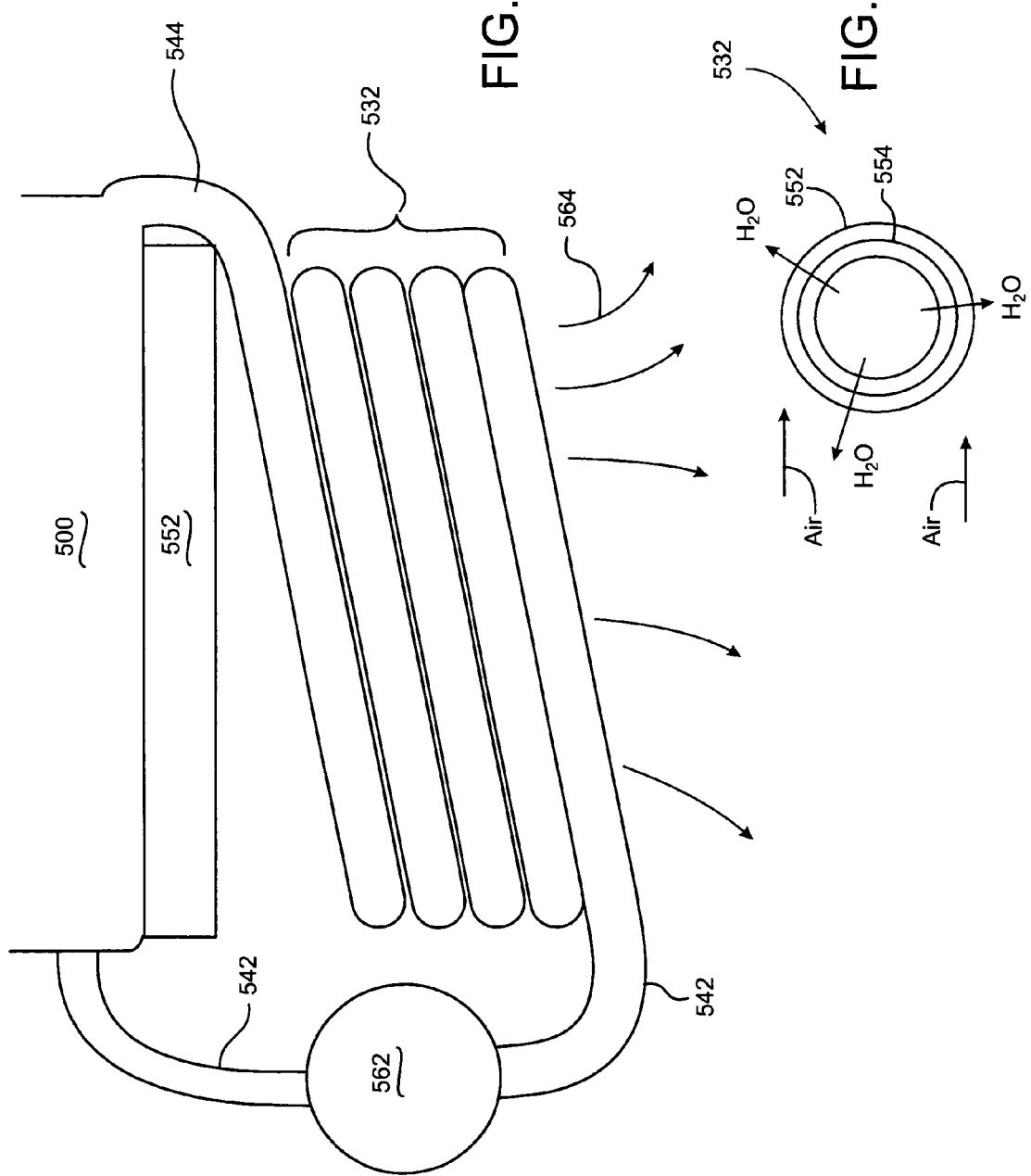

US 7,488,547 B1

FUEL CELL, COMPONENTS AND SYSTEMS

1. CROSS-REFERENCE TO RELATED APPLICATIONS

This application claims priority to U.S. Provisional Patent Application Ser. No. 60/464,874 filed Apr. 22, 2003, entitled "Improved Designs for a Reduced Cost Flexible Fuel Methanol Capable Fuel Cell and Components"; and U.S. Provisional Patent Application Ser. No. 60/500,123 filed Sep. 3, 2003, entitled "Reduced Cost Flexible Fuel Methanol Capable Fuel Cell and Components"; the contents of each of which are incorporated herein by reference in their entireties.

BACKGROUND OF THE INVENTION

1. Field of the Disclosure

The present invention relates generally to fuel cells. More particularly, the present invention relates to fuel cells utilizing flow-through electrodes and alkali electrolytes.

2. Background of the Disclosure

In general terms, a fuel cell generates DC electricity by a chemical reaction or reactions occurring at an anode and a cathode. The electricity is utilized by an electrical circuit communicating with the fuel cell. The fuel cell utilizes an electrolyte that essentially functions to transport electrically charged particles from one electrode to the other. Liquid electrolytes such as alkali, molten carbonate, and phosphoric acid, and solid electrolytes such as proton exchange membrane (PEM) and solid oxide have been employed. The fuel cell may also utilize one or more catalysts to promote the proper reactions. A basic fuel for the reactions is hydrogen, hydrocarbons, alcohols, or the like that can be oxidized. In addition, oxygen is generally reduced at the cathode. A primary byproduct is water, but conventional fuel cell designs inevitably yield several more undesired byproducts such as carbon monoxide, sulfur, and the like, particularly when employing a carbon-based fuel. Different types of fuel cells have been developed and are well-known. Generally, each type has well-known advantages and disadvantages.

In the operation of a typical fuel cell, oxygen is applied at the cathode and the fuel is applied at the anode. In some types of fuel cells, the oxygen combines with electrons returning from the electrical circuit and hydrogen ions that have traveled through the electrolyte from the anode. In other types of fuel cells, the oxygen reacts with water and electrons to form hydroxyls, which then travel through the electrolyte to the anode, where it combines with hydrogen ions. The electrolyte serves as the vehicle by which appropriate ions are transported between the anode and cathode. In alkali fuel cells, the electrolyte transports hydroxyl ions from the cathode to the anode. In molten carbonate fuel cells, the electrolyte transports carbon trioxide ions from the cathode to the anode. In solid oxide fuel cells, the electrolyte transports oxygen ions from the cathode to the anode. In phosphoric acid and PEM fuel cells, the electrolyte transports hydrogen ions from the anode to the cathode. At the anode or cathode, depending on design, hydrogen and oxygen ions combine to form the water. The fuel cell will continue to generate electricity as long as hydrogen, oxygen, and electrolyte are available for reaction and the catalyst is not too degraded.

FIG. 1A illustrates a common configuration for a membrane electrode assembly 10 known in the prior art. Membrane electrode assembly 10 consists of a proton-exchange membrane (PEM) 12 that serves as the electrolyte and as a support structure for an anode 14 and a cathode 16. The magnified view of FIG. 1B depicts the micro-scale composition of the electrodes (anode 14 and cathode 16). The composition consists of a mixture of finely divided, widely dispersed, very small (typically micro-scale) particles of platinum dust 22 supported on, and adhered to, larger but still microscopic carbon particles 24. This substrate/catalyst complex is mixed with an adhesive binder to hold it together, fibers 26 (typically carbon) to increase structural integrity, and hydrophobic PTFE 28 to help the egress of water. This mixture is applied to a structural support that, as indicated for the case of a PEM-based fuel cell, is often the electrolyte membrane 12 itself.

The current design as exemplified by membrane electrode assembly 10 illustrated in FIGS. 1A and 1B is functional and an improvement over earlier designs, but it is still embodies significant limitations. Widely recognized problems attending this design include the following. Only a small fraction of the mass of the catalyst (e.g., platinum dust 22 in FIG. 1B) is available for catalytic activity. The catalyst molecules on the surface of the catalyst particle are the only part that touches the fuel. The rest of the mass of the catalyst is trapped in the interior of the particle where it cannot touch the reactants. The extent to which the expensive catalyst is wasted in the above manner can be estimated as follows. Assuming that the particles are roughly spherical, the formula for the volume of a sphere is $V=4/3\pi r^3$, and the formula for the surface area of a sphere is $SA=4\pi r^2$. Accordingly, the ratio of surface area to volume of a sphere is $SA/V=3/r$. The radii of typical catalyst particles for PEM cells are 12.5-24.5 Å. Therefore, in PEM cells, the ratio of surface area-to-volume ranges from 1:4 to 1:8, with 1:6 as a median. It follows that only about $\frac{1}{6}^{th}$ or 17% of the platinum is potentially available as a catalyst, such that roughly 83% of the mass is wasted.

The degree of waste is much worse in direct methanol fuel cells, which require larger particles and heavier catalyst loadings. Direct methanol cells generally employ particles with radii of 44-125 Å. Plugging these numbers into the above equations reveals that the surface area-to-volume ratios vary from 1:15 to 1:41 with a median of 1:28. Therefore, only 3.6% of the surface area of catalyst is available for catalytic activity. The remaining portion of the catalyst is potentially wasted, for instance, by being locked inside the particle. Moreover, part of the 3.6-17% of platinum potentially available for catalytic activity is additionally lost to the reaction because it is in intimate contact with inert substrate materials such as PTFE, glues, structural fibers, or the carbon support itself (see, e.g., FIG. 1 and accompanying discussion above). This contact area excludes contact with the reactants and thus further limits the usable, catalytic surface area. Losses from these contact areas can be conservatively estimated to be about an additional 5%, but are usually functionally much higher.

Additionally, a yet additional loss of catalytic utilization occurs because the reaction can only take place at the triple-interface of the fuel, electrolyte, and catalyst. Only a fraction of the catalytic mass left after the above reductions encounters the electrolyte/fuel interface. Even in the case of the particles that do touch the interface of fuel and electrolyte, not all of the surface area experiences the interface. A significant amount of the catalyst does not even touch the electrolyte, and therefore does not participate in generating electricity. Furthermore, those particles that do experience a favorable interface produce or use water, thereby changing the fuel/water ratio in their immediate microenvironment, often decreasing catalytic efficiency.

Another problem is that the materials and mixtures utilized in the prior art are fairly electrically resistant. This internal resistance substantially decreases electrical production efficiency and necessitates the use of conductive current-collecting "field flow" plates that add sizeable cost and volume to the fuel cell or fuel cell stack. Currently designed field-flow plates also contribute to considerable internal resistance.

In addition, the carbon-platinum mixture utilized in prior art approaches is essentially a brittle composition of dust or a composite of powders. The mixture is sensitive to vibration and mechanical, electrical and thermal stresses. Over time the mixture tends to disintegrate and thereby limit lifespan and efficiency.

Moreover, in current fuel cell designs, the fuel flows by and diffuses into the anode but not through it. Consequently, inert compounds can build up in the pores and physically block the fuel from reaching the catalyst, hence further limiting efficiency.

Still further, the individual parts of the fuel cell stack of current technology need a uniform, fairly exact degree of humidification in order to properly function. Water is produced at one electrode and thus can potentially flood the electrode. Water is used up at the other electrode, thereby drying that electrode, and is dragged away by concentration gradients and electro-osmotic forces. To ameliorate or compensate for these flooding and drying events, current fuel cell designs must resort to the addition of extensive, costly and power-robbing balance-of-plant apparatus. Generally, balance-of-plant apparatus is the ancillary equipment necessary for supporting operation of a fuel cell and conditioning its outputs to usable forms. Balance-of-plant apparatus can include fuel stock scrubbers, controllers, heat exchangers, fuel reformers, shift reactors, humidifiers, dehumidifiers, pumps, compressors, regulators, power conditioners, tanks, valves, pipes, hoses, sensors, thermal regulators, manifolds, filters, and the like. In conventional fuel systems, the massive balance-of-plant apparatus can dwarf the actual fuel cell stack. Much of the prohibitive cost of fuel cell production can be attributed to the balance-of-plant and not the fuel cell stack itself. Unfortunately, even with the use of balance-of-plant apparatus, the simultaneous ideal humidification for each electrode (anode and cathode, as well as the electrolyte) is never quite uniformly achieved.

Poisoning and contamination remain a pervasive problem in many fuel cell designs. Catalysts suffer from poisoning by common contaminants found in many fuel stocks. They are even poisoned by intermediary compounds produced from their own reactions. Poisons can include, for instance, a variety of sulfur- and carbon-based compounds. Of special significance is carbon monoxide as it is a common intermediary compound of carbon-based fuels such as methanol. Over time, these substances adhere to the catalytic particles of conventional electrodes, degrading their performance and limiting their lifespan. Sensitivity to poisoning seriously limits the feasibility and commercial viability of the currently existing technologies. It is especially a problem in fuel cells that use currently available fossil fuels and natural gas derivatives. These fuels have relatively high amounts of sulfur compounds and complex hydrocarbons that form a variety of toxic intermediary compounds. To partially atone for this problem, manufacturers are forced to incorporate expensive, additional balance-of-plant apparatus such as those noted above, particularly fuel stock scrubbers, reformers, shift reactors, and advanced filters, all of which can be bulky and/or expensive and escalate inefficiency, maintenance requirements, and pollution. The extra equipment also requires energy to run that is parasitically drawn from the output of fuel cell. The costs attending this additional equipment can obviate the advantages they provide such as the ability to use readily available fuel stocks from the current infrastructure.

In view of the foregoing, a widely recognized need exists for ongoing improvements in fuel cells and fuel cell systems, and components thereof. In particular, a continuing need exists for increasing operating efficiencies and extending the useful life of materials and components, as well as reducing the costs, complexities, and components required for providing commercially viable fuel cells and systems.

SUMMARY OF THE DISCLOSURE

According to one embodiment, a flow-through electrode is provided for use in a fuel cell. The electrode comprises a porous substrate having a continuous and/or contiguous porosity through which a fluid can flow, and a plurality of walls oriented in different directions between the first and second sides. Voids are defined between the walls. The walls include surfaces and micro-scale pores. A multi-directional fluid flow path is defined between the first and second sides. A thin film comprising a catalytic material is disposed on the surfaces. A fuel and an electrolyte are flowable generally from the first side, through the voids and the pores of the substrate and in contact with the thin film, and to the second side.

According to another embodiment, a flow-through electrode is provided for use in a fuel cell. The electrode comprises a first region, a second region, and a third region. The first and second regions each comprise a porous substrate for flowing a fuel/electrolyte combination therethrough. The third region is interposed between the first and second regions and fluidly communicates with the first and second regions. The pore density of the third region is less than the pore densities of the first and second regions. In some embodiments, the third region is substantially hollow.

According to another embodiment, a flow-through electrode is provided for use in a fuel cell. The electrode comprises a plurality of regions, with each region being adjacent to and fluidly communicating with at least one other region. Each region comprises a porous substrate for flowing a fuel/electrolyte combination therethrough. Each region has a porosity different from the porosities of the other regions. The plurality of regions can be arranged in order of successively increasing porosity to define a porosity gradient whereby the fuel/electrolyte combination can be flowed generally with or against the porosity gradient.

According to another embodiment, a fuel cell comprises an anode, a cathode, a porous barrier interposed between the anode and cathode, an anode-side channel defined between the anode and barrier for receiving a fuel-rich fluid, and a cathode-side channel defined between the cathode and barrier for receiving a fuel-depleted fluid.

According to another embodiment, fuel cell comprises an anode, a cathode, a first channel, and a second channel. The anode comprises a first anode section, a second anode section and a third anode section. The first and second anode sections each comprise a porous substrate for flowing a fuel/electrolyte combination therethrough. The third anode section is interposed between the first and second anode sections and fluidly communicates with the first and second anode sections. The cathode comprises a first cathode section and a second cathode section. The first channel is interposed between the first anode section and the first cathode section. The second channel is interposed between the second anode section and the second cathode section.

According to another embodiment, a fuel cell comprises a first side, a second side opposing the first side, a third side, and a fourth side opposing the third side. A plurality of substantially planar electrodes are arranged substantially parallel to each other and comprise respective edges defining the first, second, third, and fourth sides. The plurality of electrodes define a plurality of first channels fluidly communicating with the first and second sides for conducting an oxygen-containing fluid generally from the first side to the second side, and define a plurality of second channels fluidly communicating with the third and fourth sides for conducting a fuel/electrolyte combination generally from the third side to the fourth side.

According to another embodiment, a fuel cell comprises an anode region and a cathode region. The anode region comprises a plurality of anodes and a plurality of anode channels. Each anode channel communicates with at least one anode. The plurality of anode channels comprise pre-anode channels for supplying a fuel-rich fluid to one or more of the anodes and post-anode channels for receiving a fuel-depleted fluid from one or more of the anodes. The cathode region comprises a plurality of cathodes and a plurality of cathode channels. Each cathode channel communicates with at least one cathode and at least one anode channel.

According to another embodiment, a fuel cell comprises an anode section and a cathode section. The anode section comprises a first anode, a second anode and an anode channel interposed between the first and second anodes. The first and second anodes each comprise a porous substrate for flowing a fuel/electrolyte combination therethrough. The anode channel fluidly communicates with the first and second anodes. The cathode section comprises a plurality of cathodes and a plurality of cathode channels. Each cathode channel communicates with at least one cathode. The cathode channels are spaced from the anode channel and fluidly communicate with the anode section.

According to another embodiment, a fuel cell system comprises a fuel cell and a conduit. The fuel cell comprises a first fluid inlet and a first fluid outlet. The conduit comprises a second fluid inlet fluidly communicating with the first fluid outlet, a second fluid outlet fluidly communicating with the first fluid inlet, and a semipermeable wall for permitting transpiration of water from the conduit and retention of fuel and electrolyte within the conduit, or vice versa.

In a method for operating a fuel cell, a flow-through electrode is provided that comprises a porous substrate and a catalyst disposed on the substrate. A fluid is flowed through the electrode. The fluid comprises an alkali electrolyte.

In another method for operating a fuel cell, the fluid further comprises an additive for supplying a supplemental source of hydroxyl ions.

In another method for operating a fuel cell, a plurality of electrodes comprising anodes and cathodes are operated to collect electrons from the anodes. The operation of at least one electrode is switched to a refresh cycle whereby catalyst supported by the electrode is cleaned.

Additional embodiments or methods can include one or more components, features, elements, or steps recited above, or combinations of one or more components, features, elements or steps recited above.

BRIEF DESCRIPTION OF THE DRAWINGS

FIG. 2A is a perspective view of an electrode according to embodiments of the present disclosure;

FIG. 2B is a detailed view of a cross-section of the structure of an electrode according to one embodiment of the present disclosure;

FIG. 2C is a detailed view of a structure of an electrode according to one embodiment;

FIG. 3A is a cross-sectional elevation view of an electrode according to an embodiment of the present disclosure;

FIG. 3B is a cross-sectional elevation view of an electrode according to another embodiment;

FIG. 5 is a cross-sectional elevation view of a fuel cell arrangement according to an embodiment of the present disclosure;

FIG. 6 is a cross-sectional elevation view of a fuel cell arrangement according to another embodiment;

FIG. 7 is a cross-sectional elevation view of a fuel cell arrangement according to another embodiment;

FIG. 11A is a schematic view of a fuel cell system according to another embodiment;

FIG. 11B is a cross-sectional elevation view of a conduit utilized in a water/thermal/pressure management system according to an embodiment of the present disclosure;

FIG. 11C is a detailed view of a portion of the fuel cell system illustrated in FIG. 11A;

DETAILED DESCRIPTION OF THE DISCLOSURE

Figures 1A, 1B:
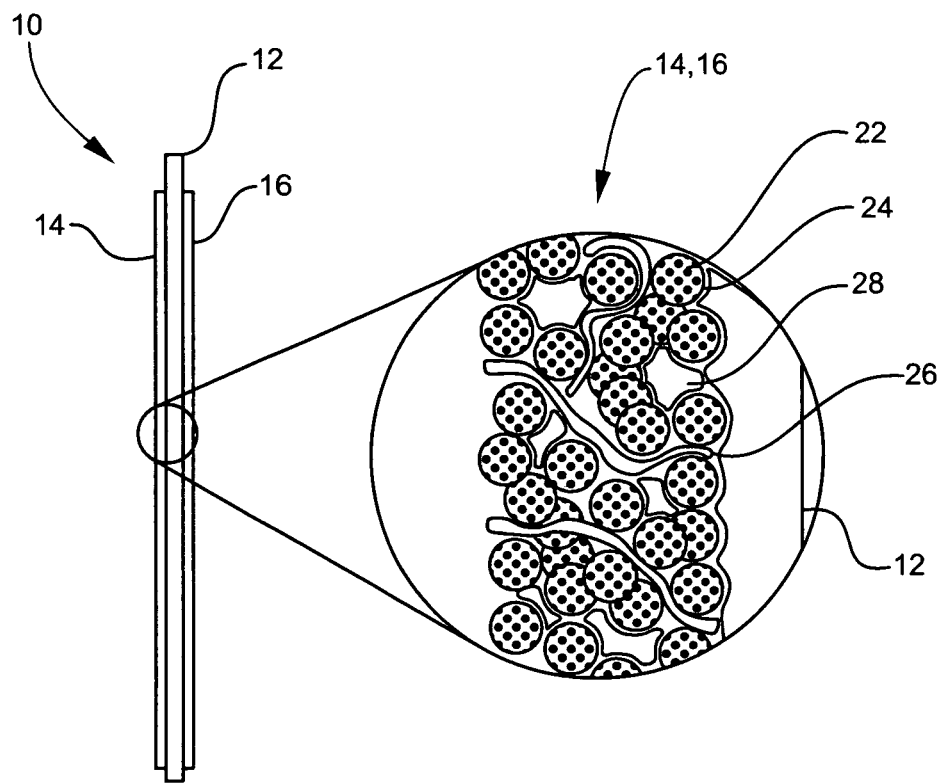
FIG. 1A is an elevation view of a known membrane electrode assembly.
FIG. 1B is a detailed view of the structure of an electrode of the fuel cell unit illustrated in FIG. 1A.

In general, the term "communicate" (e.g., a first component "communicates with" or "is in communication with" a second component) is used herein to indicate a structural, functional, mechanical, electrical, magnetic optical, fluidic, or ionic transporting, relationship between two or more components or elements. As such, the fact that one component, element, or feature is said to communicate with a second component, element, or feature is not intended to exclude the possibility that additional components may be present between, and/or operatively associated or engaged with, or otherwise interacting with, the first and second components.

As used herein, the term "fluid" generally means any flowable medium such as a liquid, gas, vapor, supercritical fluid, or combinations thereof. Moreover, the term "fluid" encompasses mixtures or combinations of liquids, vapors, gases and supercritical fluids with solid particulate matter, as in the case of particles carried in a fluid flow stream.

As used herein, the term "liquid" can include a liquid medium in which a gas is dissolved and/or a bubble is present.

As used herein, the term "vapor" generally means any fluid that can move or expand without restriction except for a physical boundary such as a surface or wall, and thus can include a gas phase, a gas phase in combination with a liquid phase such as a droplet (e.g., steam), supercritical fluid, and the like.

For convenience, the term "air" is used herein to indicate any oxygen-containing fluid such as, for instance, a gas consisting essentially of diatomic oxygen molecules or an oxygen-containing compound from which oxygen ions can be derived for oxidation reactions.

As used herein in the context of a fluid, the term "combination" generally means a multi-component material. Unless otherwise indicated or apparent, the possible relationship among the components of a combination may include, but is not necessarily limited to, a mixture, solution, suspension, matrix, colloidal structure, emulsion, particle-laden fluid, or the like.

The present subject matter is primarily directed to alkali electrolyte-type fuel cells. The basic fuel cell includes an anode and a cathode, which are typically separated by a space suitable for fluid flow, such as a chamber, channel, conduit, or the like. An oxidizable fuel such as a hydrogen-containing fuel is supplied to the anode, and an oxygen-containing fluid is supplied to the cathode. The fuel is not required to be pure diatomic hydrogen, but can include hydrocarbon- or alkyl-based fuels. A particularly advantageous example of a hydrocarbon fuel is methanol ($CH_3OH$) or similar low-molecular weight alcohol. Alkanes and alkenes may also be utilized but are less preferred due to their byproducts. In other embodiments, it is advantageous to use a borohydride as the fuel, such as sodium tetraborohydride ($NaBH_4$). Advantageously, the electrolyte is a liquid-phase solution of a hydroxide compound in water. Suitable hydroxide compounds include metal hydroxides such as, but not limited to, potassium hydroxide (KOH). In operation, hydroxyl ions ($OH^-$) migrate from the cathode to the anode. At the anode, hydrogen reacts with the $OH^-$ ions to produce water and release electrons. Electrons generated at the anode supply electrical power to an external circuit, which can be any suitable electrical load such as a battery or other storage device or a work-producing electrical device or machine. The electrons are then returned to the cathode to complete the electrical circuit. At the cathode, the electrons react with oxygen and water to produce more hydroxyl ions that diffuse into the electrolyte. The electrodes are formed as flow-through structures that permit the transport of liquid and/or gas phases. The electrodes can be structured to provide an optimized catalytically-active flow-through bulk matrix enabling maximal exposure to fluidic reactants. The structure of the substrate of the electrode can include an interconnected array or network of pores and voids (which may also be considered to be pores) of asymmetrical and/or symmetrical shapes and random and/or ordered sizes and locations. Fluidic flow through the electrode can be passive (e.g., hydrodynamic, convectional, or the like) or forced such as by using a pump.

According to embodiments of the present disclosure, an improved electrode is provided for use in a fuel cell, and particularly a flow-through fuel cell in which the electrolyte is a flowable medium such as a liquid phase combinable with a suitable fuel. The electrode is particularly useful as an anode from which electrons can be conducted for providing a source of electrical energy. The basic structure of the electrode is a porous, flow-through, high-surface area microstructure or substrate. The substrate, or a component or components thereof, can be electrically conductive and catalytically active. The substrate is structured to enable a fluid such as a fuel/electrolyte or fuel/electrolyte/water combination to completely flow through the substrate, rather than merely by or into the substrate, while contacting a tremendous surface area (as compared with the bulk volume) of the substrate. In advantageous embodiments, the catalyst is provided by a thin film or coating disposed throughout the extensive surface area of the substrate. The electrode exhibits good intrinsic electrical conduction for integral current collection. Current collection can be further enhanced by embedding or otherwise incorporating a mesh of fine wire or other electrically conductive material within the substrate.

A variety of configurations and manufacturing processes can provide the desired porosity characteristics for the flow-through, high-surface area design. Examples of configurations for the substrate can include, but are not limited to, open cellular, reticular, foamed, sintered, sponge, raney, nanostructure, vitreous, pasted, slurry, gel, sol-gel, and/or aero-gel substructures. Materials for the substrate can include, but are not limited to, porous conductive plastics, carbon compounds or composites, ceramics, metals, and metal-containing compounds, solid mixtures and alloys. Metals can include, but are not limited to, stainless steel, nickel, silver, molybdenum, titanium, and alloy or compounds including one or more of these metals. Nickel has been found to be particularly advantageous in embodiments described herein. The microstructure of the material is engineered with respect to porosity, pore size, pore shape, wall size, wall shape and wall thickness, as well as density to maximize the surface area available for catalyst/reactants interaction, while preserving desired flow-through characteristics. In one advantageous embodiment, the electrode comprises a substrate structured as an open-cell, thin-walled metal sponge with a thin-film coating. An important factor is that the pore volume, shape and wall configuration be optimized for both flow and maximal reactant/catalyst interaction. As described further below, in one embodiment, the walls of the substrate can be hollow.

In one advantageous method for fabricating a flow-through, high-surface area electrode, particles (which may be filaments and/or flakes) of a base material are coated with a thin continuous or discontinuous layer of catalyst. The catalyst-coated particles are then sintered to form a porous electrode having flow-through and extremely high-surface area characteristics. This method avoids the pore-size limitations associated with more conventional techniques such as electroless plating, but has the added challenge of maintaining the uniformity of the coating layer during the sintering process. Higher pressure, lower temperature techniques enable this method. As previously indicated, one or more conductors, such as a mesh of fine wire, can be incorporated into the bulk of the particles during sintering to promote electrical conduction in the resulting electrode.

In another method, a porous reticular metal substrate is fabricated. Depending on the method of manufacturing employed to make the structure porous, additional means are usually employed to increase the available surface area. One such means includes sintering additional substrate(s) into the voids of the porous material (see, e.g., FIG. 2E). This is one approach for obtaining the desired surface area. The sintered material may be coated metal particles or flakes (see, e.g., FIG. 2F). Traditional carbon supported catalyst can be retained in the voids as well.

Surfaces of the substrate can be roughened to further increase catalytically-active surface area by any suitable microfabrication/micromachining or surface preparation technique, such a technique employed in the microelectronic, MEMS, and microfluidic fabrication industries. One non-limiting example is wet (chemical) etching.

In one embodiment, the electrode has a thickness of approximately 5 mm or less and the catalytic surface area exposed to a fluid such as a fuel/electrolyte combination is approximately 10 $m^2/cc$ or greater. The pore size, which may be defined as a diameter or any other characteristic dimension suitable for the shape of the pores, may vary within a micro-scale or milli-scale range. In one embodiment, the average pore size is approximately 0.01 mm. The size of the walls defining the microstructure of the substrate may be optimized for maximal thinness while preserving structural integrity and electrical conuctivity. Generally, depending on design and application specifics, there can be considerable variation of practical densities, porosities, pore sizes, and the like.

In some embodiments, the electrode is formed from a nickel or nickel-chromium based reticulated foam substrate with a pore size of approximately 0.4 mm. The available surface area is approximately 5600 $cm^2/cc$. Various methods for augmenting the surface area described herein can be utilized to boost the available surface area above 10 $m^2/cm^2$. Because the catalyst is utilized so effectively in embodiments disclosed herein, much less catalyst may be used while achieving much greater efficiency.

In another embodiment, an electrically conductive substrate for a fuel cell comprises open cellular continuous or contiguous interlacing porosity with micro- and/or nano-scale surface modifications that increase surface area and non-scale roughness of the pore walls. The cavernous porosity and pore size are particularly adapted for flow-through of a fluidic fuel/electrolyte combination. The flow can be oscillating but with an overall directional movement. The porous conductive substrate can be coated with a thin-film catalyst to intrinsically operate with good conductivity and low impedance, while the conformation of the substrate allows for an introduced or externally generated electric potential to act on the catalyst/fluid interface for the purpose of removing poisons adhered to the catalyst surface. The flow-through porosity is further engineered so that the detergent/surfactant compounds added to the electrolyte in some embodiments, as well as the bulk flow of the electrolyte, serve to wash away byproducts, prevent concentration gradients, and reduce poisoning species. A thin film coating of catalytic material can be applied to the modified surface of the electrode in such a way that a substantially high proportion of the catalytic molecules are presented as the active surface area. This active surface area can be enhanced by the coating conforming to roughened pore walls, and providing nano-protrusions of catalytic material that present additional edges or surfaces.

In another embodiment, an electrically conductive substrate to be used in a fuel cell as an electrode comprises sintered amorphous filaments, flakes, and/or nano-powders that create a random dispersion of asymmetrical and amorphous voids between wall structures created by the sintered material. The substrate establishes an interconnected cavernous network tailored specifically for oscillating, but generally directional, flow of electrolyte and/or fuel mixtures through the substrate. The inner surfaces can also contain modified nano-surfaces throughout the network of inner cavernous surfaces so that nano-protrusions and crevices create a high internal specific surface area and are part of the substrate itself, to which a thin film of catalytic material is applied so that efficiency of the available catalytic surface is maximized.

The substrate of the electrode may be directly composed of conductive/catalytic material (see, e.g., FIG. 2I) or may embody a different base material with a thin film coating(s) for conductive and/or catalytic function (see, e.g., FIG. 2C). The catalytic layer may be mixed with or layered on the substrate to increase conductive function. The porous substrate is either electrically conductive itself or has conductive additives or coatings. In either case, the resulting microstructure acts as a low-resistance integral current collector.

The effectiveness of electrodes disclosed herein as current collectors enables the use of edge-connection conductive components that require less material and are low-cost. For example, a simple off-the-shelf busbar can be connected to an edge of the electrode for conducting current. The walls may include a dielectric layer between two conductive layers to create a capacitor effect. The core may be a polymer/ceramic combined with a metallic conductor and/or catalyst.

Materials for electrodes can be selected and blended/alloyed/combined for conductivity (silver, molybdenum, etc.), catalytic activity (platinum, palladium, ruthenium, manganese, silver, etc.), cost (nickel, etc.), corrosion resistance (stainless steel, etc.). Metals utilized herein may include transitional metals, as well as oxides and nitrides.

The electrode may embody a porous substrate combined with pasted, grown, or packed material in the voids for the enhancement of the surface area. An example of this would be a metal sponge in which the voids contain a carbon-supported catalyst mixture. In another example, nanostructures such as nanotubes on nanohorns are grown onto the porous base metal into the voids for the dispersion of catalyst over a greater surface area. During manufacture, the surface may be treated by a micro-etch process and during the process three-dimensional structures such as nanospires or bumps can be added. The resulting roughened surface is analogous to intestinal microvilli (see, e.g., FIG. 2G). The catalyst can coat or be integral to the nanostructures. In another example, a powder of high-surface area, low-mass flakes or particles are pasted, sintered, etc. directly into the voids (see, e.g., FIG. 2F) or formed as the base structure itself.

In other embodiments, modified zeolites are utilized to form the anode body. Zeolites can provide excellent porosity and surface area-to-volume ratio. The zeolites are strategically modified by any suitable technique to increase conductivity and to incorporate catalytic function. These methods include, but are not limited to, plating, deposition and substitution of conductive and catalytic compounds. Zeolites may also be formed in the voids of a porous substrate.

The electrode can be manufactured in a variety of application-specific shapes and sizes. Examples of shapes include, but are not limited to, flat plate, corrugated, tubular, conical, and cylindrical.

In embodiments and methods disclosed herein, fluid flows are established that can include a combination of fuel, electrolyte, and/or water. In addition, the primary use of liquid phases facilitates the incorporation of any suitable functional additives such as surfactants, detergents, solvents, preservatives, buffers, and the like. For instance, solvents and/or detergents can be added to assist in cleaning the electrodes of poisons or toxins and microclimate concentration gradients. Additives can assist in dissolving compounds that could otherwise precipitate out and cause a cake or other obstruction that physically clogs the electrodes. Additives can break up the surface tension of product water globules to reduce efficiency-sapping microclimate concentration gradients. In conventional direct methanol cells, which do not employ a flow-through design and cleaning additives, concentration gradients limit designers to larger, more wasteful platinum particles. Additives can also function to oxygenate the electrolyte to further enhance cleaning. Additives appropriate for such functions are readily available and known to persons skilled in the art.

Many fuel cells of recent design, an example of which is described above with reference to FIGS. 1A and 1B, rely on the diffusion of ions through an electrolyte that is a solid medium to complete a separated redox reaction that creates the electric charge potential. By necessity, this medium restricts the passage of parasitic internal electric currents. The mass transport of ions through the electrolyte is one limiting factor on overall reaction rates. Because the overall ionic charge balances must remain neutral, an ion cannot react at one electrode until one is made at the other.

By contrast, the improved electrolyte-containing fluid employed in the embodiments disclosed herein can include buffers, hydroxyl carriers, and multibasic compounds (e.g., polyhydroxyl alkalis). These additives can increase mass transport efficiency. They allow a degree of charge-balanced hydroxyl supply margin that can hasten focal reactions that are restricted by conventional approaches. When focal conditions cause relatively hydroxyl-depleted regions, additional hydroxyls can be locally drawn from the electrolyte chemical reserve provided by the additives.

In a typical fuel cell, the flow of charged ions through the electrolyte, and of electrons through the circuitry connected to the fuel cell, in effect creates a closed-loop path. The reaction rate of any part of the overall process is restricted to the rate of the slowest step of the process, which typically is the passage of ions through the electrolyte. However, according to the subject matter disclosed herein, extra hydroxyls are available from the electrolyte to promote a faster basal rate at the rate limiting focal regions. Sections of the electrode experiencing a relative dearth of hydroxyls can "pull" the needed hydroxyls from the chemical reserves of the buffers, polyhydroxyl alkalis, and/or hydroxyl carriers in the electrolyte. Temporary fluctuations in microconditions do not impact the overall reaction rate as compared with prior art approaches. A degree of elasticity is thus introduced into the system.

With the advantages of overall increase in hydroxyl transport by polyhydroxyl alkalis, buffers, and/or hydroxyl carriers, it is possible to reduce the limitation of charge mass transport and thereby increase the rate of the overall reaction. Moreover, the anodes and cathodes can be spaced further apart to reduce crossover electrical currents, as shown in embodiments described below. Examples of embodiments of electrodes having advantageous microstructures according to the subject matter disclosed herein will now be described with reference to FIGS. 2A-2J.

FIG. 2A illustrates an electrode 100 according to an exemplary embodiment of the subject matter disclosed herein. In the illustrated example, electrode 100 comprises a microstructure that generally forms a flat plate. The scope of the present subject matter, however, is in no way limited to any particular geometry for electrode 100 as previously indicated. The microstructure that defines electrode 100 is structured so as to allow a fluid to flow through the microstructure. For instance, a fluid can flow from a fluid ingress side 102 of the microstructure as indicated by arrow 104, through the entire thickness of the microstructure, and out from a fluid egress side 106 of the microstructure as indicated by arrow 108. Apart from the example specifically illustrated in FIG. 2, the microstructure can be designed such that fluid ingress can occur at any one or more sides and fluid egress can occur at any one or more sides. When electrode 100 is employed as an anode, a fuel-rich fuel/electrolyte combination can be supplied to the illustrated fluid ingress side and flowed through the microstructure in a net forward direction or directions. Due to catalysis-promoted reactions within the microstructure, a resulting fuel-depleted fuel/electrolyte combination egresses from the illustrated fluid egress side. A conductive structure such as a metal screen or mesh 110 can be incorporated into the microstructure body to enhance the current conducting capabilities of electrode 100.

As illustrated in more detail in FIGS. 2B and 2C, the microstructure of electrode 100 comprises a porous substrate 120. Porous substrate 120 can include a solid, yet porous, framework defined by a plurality of thin walls 122 and voids or flow channels 124 between walls 122. In addition, a thin film 126 (FIG. 2C) composed of a catalytic and/or conductive material is disposed on walls 122. The thin film 126 is also porous, meaning that the thin film 126 is at least permeable to a fuel/electrolyte combination. The thin film 126 can have a rough or three-dimensional profile to greatly increase surface area, as described by way of further examples below. Pores 128 are schematically depicted in FIGS. 2B and 2C. The walls 122 have a multi-directional orientation. In the illustrated example, some walls 122 are vertically oriented while others are horizontally oriented. It will be understood, however, that the terms "vertically" and "horizontally" are used only in their relative sense and not as any limitation on the possible orientations of the various walls 122 of substrate 120. A fluid such as a fuel/electrolyte combination flows through voids 124 and pores 128 as indicated by arrow 130 in FIG. 2B. Due to the multi-directional orientation of the microstructure, the fluid flow can have several flow components in differing directions. The net flow, however, occurs in a single forward direction as depicted by arrow 130. The multi-directional orientation of the microstructure maximizes contact between a fluid such as a fuel/electrolyte combination and thin film 126, and thus maximizes catalytic activity. At the same time, however, the resultant flow is not significantly restricted by the illustrated microstructure. Moreover, the catalyst is presented as a thin-film coating 126 covering extensive surface areas of channels 124 of the porous substrate 120, instead of being bound up inside particles and clogged with binders. Consequently, a much higher percentage of the catalyst can be presented as usable surface area, as compared to the configurations of the prior art. The fuel flowing through the microscopic voids 124 and pores 128 in electrode 100 is presented with much more catalytically active surface area per gram of catalyst than is possible with current designs. Therefore, much less catalyst is needed. In fact, because the catalyst is used with such higher efficiency, other catalysts besides platinum can be blended into the coating, further decreasing platinum loading requirements and attendant cost.

Figure 2D:
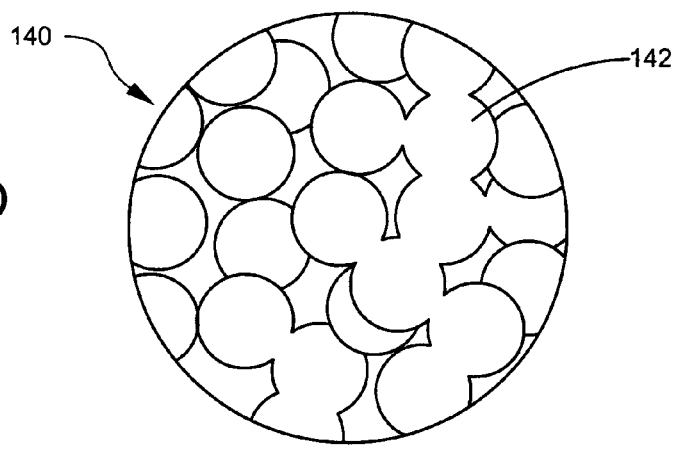
FIG. 2D is a detailed view of a structure of an electrode according to another embodiment.

FIG. 2D illustrates a microstructure 140 in which microparticles 142 have been sintered to form the porous substrate of an electrode. Microparticles 142 can have a high-surface area morphology, and can be coated with a thin-film catalyst as described above. As previously indicated, the coating can be substantially continuous or discontinuous. For a greater catalyst dispersion and greater ease of sintering, microparticles 142 can be coated in a patchy or splattered/scattered pattern rather than continuously and/or the catalyst coated particles can be mixed with uncoated particles. In some embodiments, catalyst particles are mixed with particles with less or no catalytic activity.

Figure 2E:
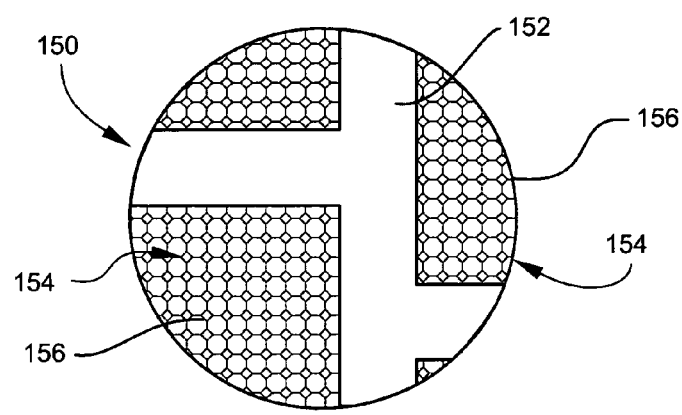
FIG. 2E is a detailed view of a structure of an electrode according to another embodiment.

FIG. 2E illustrates an embodiment in which a porous substrate 150 comprises walls 152 defining voids 154 that are filled with particles 156. These particles 156 can comprise a conductive and/or catalytic material, and/or a support structure on which conductive and/or catalytic materials are supported or retained by any suitable means. As further examples, particles 156 can comprise a carbon support/platinum matrix, or catalyst-coated sintered particles as depicted in FIG. 2D.

Figure 2F:
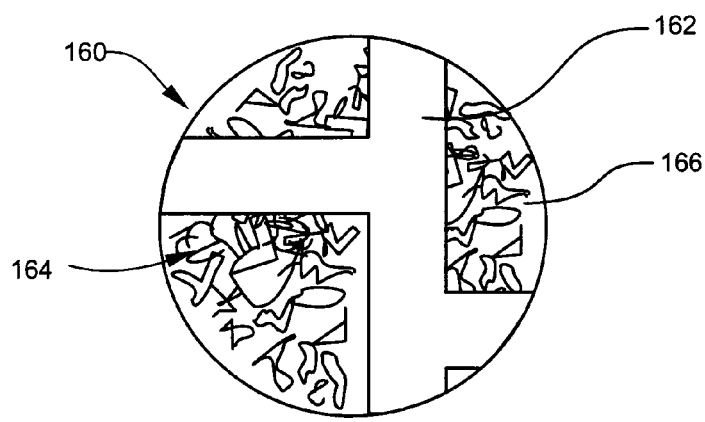
FIG. 2F is a detailed view of a structure of an electrode according to another embodiment.

FIG. 2F illustrates an embodiment similar to that shown in FIG. 2E, but in which a porous substrate 160 comprises walls 162 defining voids 164 that are filled with high-surface area flakes 166. Flakes 166 may have a twisted geometry. The composition of flakes 166 can comprise a catalytic material, or a non-catalytic or less-catalytic core that is coated with a catalytic material.

Figure 2G:
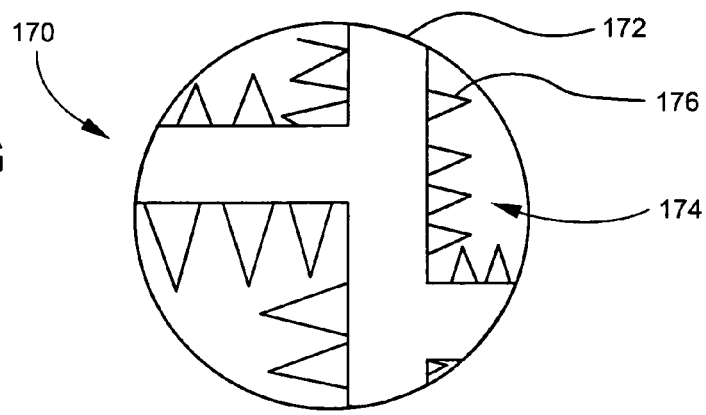
FIG. 2G is a detailed view of a structure of an electrode according to another embodiment.

FIG. 2G illustrates an embodiment in which a porous substrate 170 comprises walls 172 defining voids 174. Protrusions or bosses, such as nanostructures or microstructures 176 are grown, deposited, attached, or otherwise disposed by any suitable technique on porous substrate 170. Nanostructures 176 can be nanotubes or nanohorns. The profile of each nanostructure 176 can be generally conical, acicular, columnar, crystalline, epitaxial, domed, pellicular, luminal, shaped as a mesa, shaped as a conic section, or shaped similar to an intestinal microvillus. Such protrusions 176 extending into voids 174 greatly increase the surface area available for contact with a fluid and thus catalytic activity within the electrode. Nanostructures 176 can inherently be conductive and/or catalytically active, or can include coatings that are conductive and/or catalytically active.

Figure 2H:
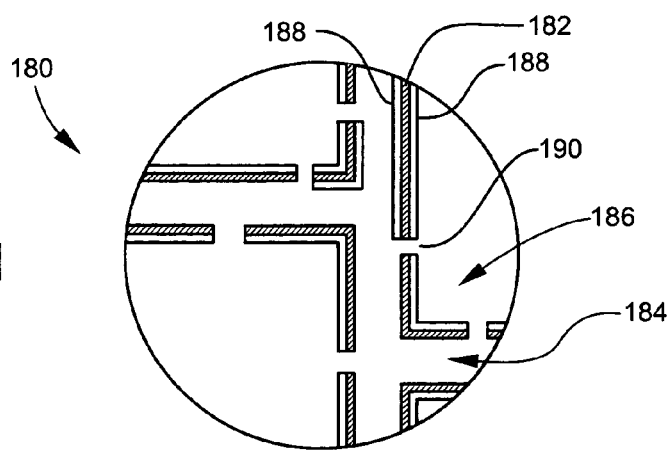
FIG. 2H is a detailed view of a structure of an electrode according to another embodiment.

FIG. 2H illustrates an embodiment in which a porous substrate 180 includes walls 182 that are hollow and thus have interiors 184 distinct from voids 186. In some embodiments, a thin film 188 is disposed not only on the surfaces of walls 182 facing voids 186 but also on inner surfaces of walls 182 facing interiors 184. Pores 190 provide communication between interiors 184 of walls 182 and voids 186, which may enable catalytic and/or ionic activity within interiors 184 of walls 182.

Figure 2I:
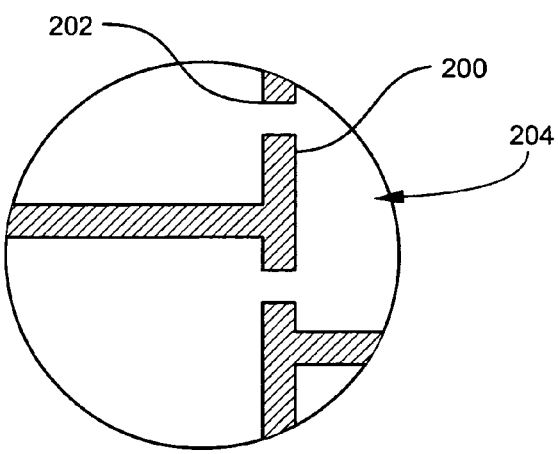
FIG. 2I is a detailed view of a structure of an electrode according to another embodiment.

FIG. 2I illustrates an embodiment in which electrode comprises a porous, solid core substrate 200. The material of substrate 200 directly provides catalytic and conductive functions without the need for coatings or thin films. Fluid flows through pores 202 of substrate 200 and voids 204 defined between the solid portions of substrate 200.

Figure 2J:
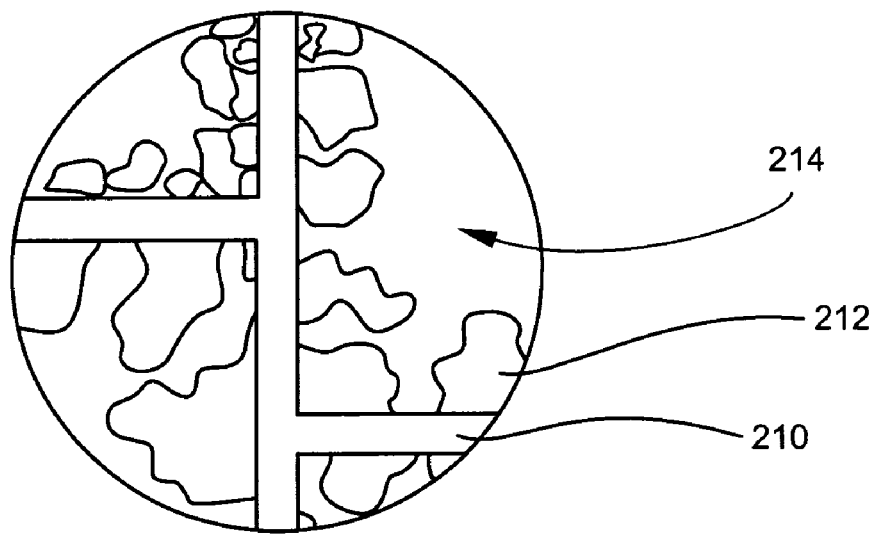
FIG. 2J is a detailed view of a structure of an electrode according to another embodiment.

FIG. 2J illustrates an embodiment in which an electrode comprises a porous, solid core substrate 210. High-surface area particles 212, which can be of substantially uniform or irregular shape, are disposed on the walls of substrate 210 and extend into voids 214. As in other embodiments, particles 212 add a three-dimensional profile to substrate 210, greatly increasing surface area. These particles 212 can comprise a material exhibiting electrically conductive and/or catalytic properties.

FIG. 3A illustrates an embodiment of an anode 220 that comprises a plurality of distinct anode sections (or regions, layers, zones, etc.) as a means for optimizing fluid/catalyst interaction while reducing the potential for forming activity-depleted regions within the body of anode 220. First and second, or outer, anode regions 222 and 224 comprise a porous substrate and can be structured according to any of the embodiments described above. A third anode region 226 is interposed between first and second anode regions 222 and 224. As compared with third anode region 226, the microstructure of first and second anode regions 222 and 224 is characterized by small channel or void dimensions and a large number of pores per length/area/volume for maximizing surface area. Third anode region 226 can be hollow and defined by inward-facing sides of first and second anode regions 222 and 224, in which case third anode region 226 does not include a porous substrate. Alternatively, third anode region 226 can comprise a porous substrate of greater pore size and relatively lower density than the porous substrate of first and second anode regions 222 and 224. In either case, third anode region 226 provides a high-flow core of anode 220 that facilitates the influx of a fluid at an inlet end 234 and along the length of anode 220, and first and second anode regions 222 and 224 provide comparatively lower flow-through characteristics to maximize contact and interaction of the fluid with the catalyst. After introduction into third anode region 226, the fluid can then flow from third anode region 226 transversely into and through first and second anode regions 222 and 224 where it can contact a large surface area of catalyst, and egress out from sides of first and second anode regions 222 and 224 distal to third anode region 226, as indicated by arrows 236. A boundary 238 of any suitable type can be disposed at an axial end 240 of anode 220 opposite to inlet end 234 to facilitate conduction of fluid flow in directions transverse to the axis of third anode region 226. In other embodiments, the direction of fluid flow can be the reverse of that shown by the arrows in FIG. 3A. First, second and third anode regions 222, 224, and 226 can be arranged as adjacent flat plates or chambers. Alternatively, first and second anode regions 222 and 224 can be part of a contiguous substrate such as a cylinder surrounding third anode region 226, in which case FIG. 3A can be considered as illustrating a cross-section of anode 220.

FIG. 3B illustrates another embodiment of an anode 250 that comprises a plurality of distinct anode sections or regions as a means for optimizing fluid/catalyst interaction while reducing the potential for forming activity-depleted regions within the body of anode 250. In this embodiment, a pore-size gradient is built into anode 250 by providing anode regions of successively decreasing pore size. While any number of anode regions can be provided, anode in the illustrated example includes a first anode region 252, a second anode region 254 adjacent to first anode region 252, and a third anode region 256 adjacent to second anode region 254. First anode region 252 is optimized for high-flow rate, low-flow resistance conditions by having relatively large pore size and less density. Second anode region 254 is an intermediate zone having a medium-sized pores, medium surface area and medium resistance to flow. Third anode region 256 has even smaller pore sizes and channels and relatively higher resistance to flow for maximizing surface area available for catalyst-fluid interactions. In one embodiment as illustrated, the larger pores are on a fluid ingress side 262 of anode 250 and the fluid flows into progressively narrower channels in a net direction toward a fluid egress side 264 as indicated by arrows 266. This design increases the available catalytic surface area while not significantly increasing resistance to fluid flow, and helps to eliminate fuel-depleted regions especially in thicker anode designs. In another embodiment, fluid flow occurs in a net direction opposite to that indicated by arrows 266. This latter embodiment may be more advantageous in certain implementations because the highest fuel concentration is applied to the greatest catalytic surface area provided by anode 250.

Any of the electrodes (anodes and cathodes) disclosed herein can include one or more semipermeable membranes on one or more sides that serve to separate fuel, electrolyte and/or water from a combined fluid. For example, FIG. 4A illustrates an electrode 280 that includes a semipermeable membrane 282 disposed on a fluid egress or downstream side 284 of a substrate body 286 of electrode 280. Membrane 282 is constructed of any suitable material that is substantially permeable to electrolyte and/or water but is impermeable or substantially impermeable to fuel such that the passage of fuel from fluid egress side 284 is substantially prevented. Accordingly, a fluid such as a fuel/electrolyte (and water) combination can pass into the complex of electrode 280 from a fluid ingress side 288 and through the thickness of substrate body 286 as indicated by arrow portion 290. Membrane 282 permits the electrolyte (and water) to pass through from fluid egress side 284 as indicated by arrow 292, but in effect selectively impedes the passage of fuel components through fluid egress side 284 and membrane 282 such that the fuel is distributed or transmigrates more fully through substrate body 286 as indicated by arrow 294. When electrode 280 is employed as an anode, membrane 282 assists in increasing the fuel concentration in the microstructure, thereby increasing catalytic efficiency. Moreover, the fluid reaching the accompanying cathode (not shown) of a fuel cell is further fuel-depleted, thereby decreasing the potential for problems associated with fuel crossover losses. A membrane 282 positioned in the location illustrated in FIG. 4A should also allow the passage of hydroxyl ions.

Figure 4B:
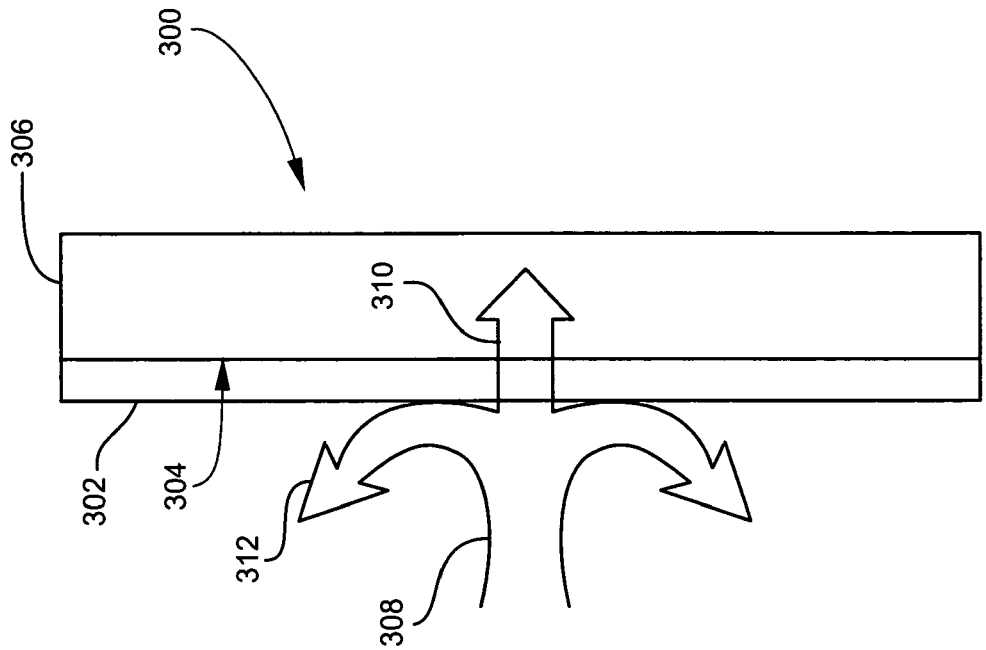
FIG. 4B is a cross-sectional elevation view of an electrode according to another embodiment.
Figure 4A:
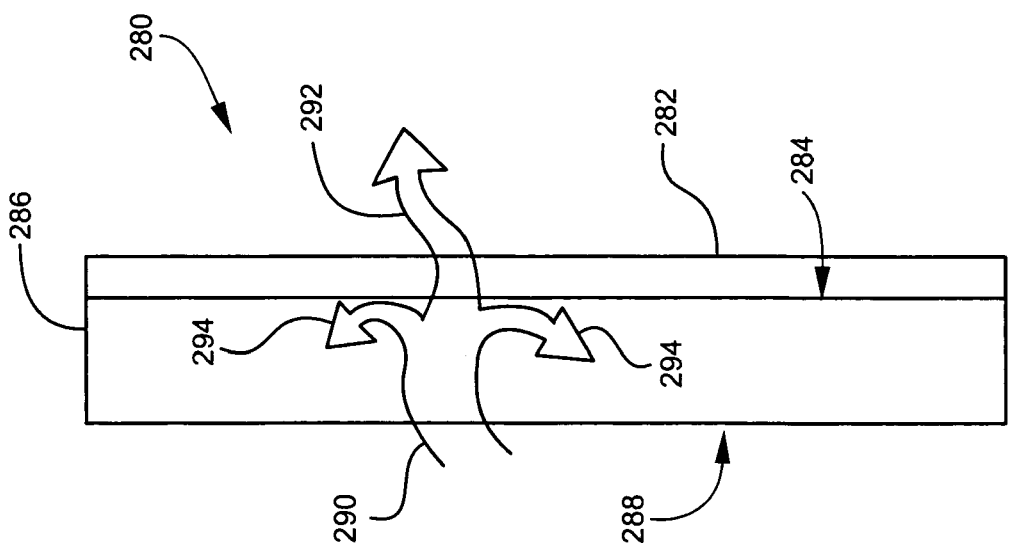
FIG. 4A is a cross-sectional elevation view of an electrode according to another embodiment.

FIG. 4B illustrates an electrode 300 that includes a semipermeable membrane 302 disposed on a fluid ingress side 304 of a substrate body 306. This membrane 302 is constructed of any suitable material that is substantially permeable to fuel and electrolyte but is impermeable or substantially impermeable to water such that the passage of water into electrode 300 is substantially prevented. Accordingly, the fuel and electrolyte components of a fluid 308 can pass through membrane 302 and into the complex of electrode 300 from fluid ingress side 304 as indicated by arrow 310, but water is substantially separated from the fluid flow and prevented from entering electrode 300 as indicated by arrows 312. Similar to the effect of membrane 282 in FIG. 4A, membrane 302 in FIG. 4B serves to increase fuel concentration within the body of electrode, particularly in case where the fluid combination supplied to fluid ingress side 304 is diluted due to the presence of water.

FIG. 5 illustrates a fuel cell 320 having an electrode arrangement in which an anode 322 similar to that shown in FIG. 4A is sandwiched between two cathodes or cathode regions 324 and 326. First and second, or outer, anode regions 328 and 330 comprise a porous substrate structured according to any of the embodiments described above. A third anode region 332 is interposed between first and second anode regions 328 and 330 and is rarified or hollow relative to first and second anode regions 328 and 330. A first channel or chamber 334 is interposed between first anode region 328 and first cathode region 324, and a second channel or chamber 336 is interposed between second anode region 330 and second cathode region 326. A first hydrophobic membrane 342 can be provided at an air ingress side of first cathode region 324 and a second hydrophobic membrane 344 can be provided at an air ingress side of second cathode region 326. First and second hydrophobic membranes 342 and 344 allow air to permeate first and second cathode regions 324 and 326, respectively, while preventing the escape of other fluid components such as water. First, second and third anode regions 328, 330 and 332; first and second cathode regions 324 and 326; first and second chambers 334 and 336; and first and second hydrophobic membranes 342 and 344 can be arranged as generally parallel flat plates or planar chambers. Alternatively, first and second anode regions 328 and 330 can be part of a contiguous substrate such as a cylinder surrounding third anode region 332, first and second chambers 334 and 336 can be part of a contiguous annular space coaxially disposed about the anode layers, first and second cathode regions 324 and 326 can be part of a contiguous substrate coaxially disposed about the annular space defined by first and second chambers 334 and 336, and first and second hydrophobic membranes 342 and 344 can be part of a contiguous membrane surrounding an outer side of the cathode structure. In such a case, FIG. 5 can be considered as illustrating a cross-section of fuel cell 320.

In one embodiment of fuel cell 320, a fuel-rich fluid enters one or both axial ends of both first and second chambers 334 and 336, flows between the cathode and anode structures, and filters through first and second anode regions 328 and 330 as indicated by the arrows. The resulting fuel-depleted fluid enters the high-flow third anode region 332 and is discharged from fuel cell 320 at one or both axial ends of third anode region 332. In another embodiment, the flow direction is reversed, i.e., fluid enters fuel cell 320 at one or both axial ends of third anode region 332 and exits fuel cell 320 at one or both ends of first and second chambers 334 and 336. The fluid flow paths established by either embodiment can be advantageous in augmenting the mass transport of hydroxyl species from the cathode structure to the anode structure.

FIG. 6 illustrates another fuel cell 360 having a flow-by/flow-through arrangement in which an anode 362 is sandwiched between two cathodes 364 and 366. A first channel or chamber 368 is interposed between anode 362 and first cathode 364, and a second channel or chamber 370 is interposed between anode 362 and second cathode 366. A first hydrophobic membrane 372 can be provided at an air ingress side of first cathode 364 and a second hydrophobic membrane 374 can be provided at an air ingress side of second cathode 366. In some embodiments, FIG. 6 represents a cross-section of a fuel cell having a cylindrical or other three-dimensional geometry. Fuel-rich fluid enters fuel cell 360 at one axial end and flows through first and second chambers 368 and 370 between anode 362 and first and second cathodes 364 and 366. Fuel-depleted fluid exits fuel cell 360 at the other axial end. Fluid permeates the microstructure of anode 362 from both planar sides of anode 362. The net direction of fluid flow is through the axial length of anode 362.

FIG. 7 illustrates another fuel cell arrangement 380 in which an anode 382 is paired with a cathode 384. Anode 382 is thicker than cathode 384. Generally, for any embodiment disclosed herein, the relative sizes of anodes and cathodes can depend on a number of factors, including operating environment, application-specific parameters, the type of fuel employed (e.g., methanol, sodium borohydride, etc.), and the like. A chamber 386 is defined between anode 382 and cathode 384. Fuel-rich fluid ingresses into anode 382 from a side opposite to cathode 384, as indicated by arrow 388. Fuel-depleted fluid egresses from anode 382 into chamber 386, from which the fluid can be removed from fuel cell 380. In another embodiment, the fluid flows in an opposite path, i.e., through anode 382 from chamber 386. FIG. 7 also illustrates a hydrophobic membrane 390 located at an air ingress side of cathode 384.

Figure 8:
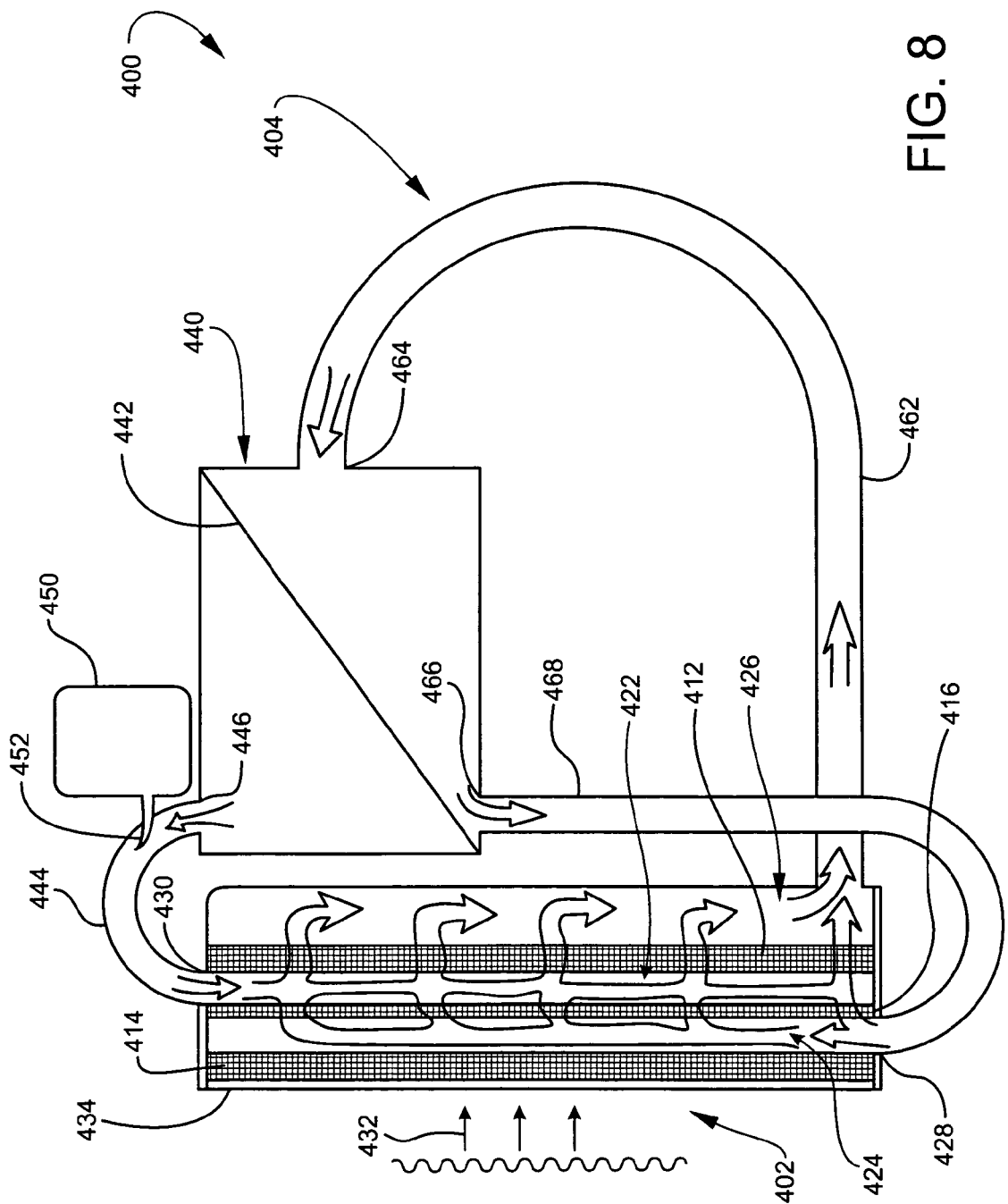
FIG. 8 is a schematic view of a fuel cell system, including a cross-sectional elevation view of another fuel cell arrangement, according to an embodiment of the present disclosure.

FIG. 8 illustrates a fuel cell system 400 according to one embodiment. Fuel cell system 400 generally comprises a fuel cell 402 and balance-of-plant apparatus 404. Fuel cell 402 includes an anode 412 and a cathode 414 spaced from anode 412. These electrodes can have any suitable flow-through structure, but in advantageous embodiments at least anode 412 has the structure of the embodiments specifically described in the present disclosure. Fuel cell 402 can be a single fuel cell unit, i.e., an anode/cathode pair, or can be a fuel cell stack in which an appropriate combination of a plurality of anodes 412 and cathodes 414 are arranged with appropriate manifolds for directing the flow of fuel, electrolyte, water, and oxygen-containing fluid (e.g., air). In the present example, a porous, non-selective permeable barrier or membrane 416 is interposed between anode 412 and cathode 414. An anode-side chamber 422 is disposed or defined between barrier 416 and anode 412. Likewise, a cathode-side chamber 424 is disposed or defined between barrier 416 and cathode 414. A fluid collection chamber or manifold 426 is disposed on the side of anode 412 opposite to barrier 416. Relatively fuel-depleted fluid enters cathode-side chamber 424 at an inlet 428, flows through cathode-side chamber 424, and is directed through barrier 416 and into anode-side chamber 422 as indicated by the arrows, and carries hydroxyls produced by cathode 414. Relatively fuel-rich fluid flows through anode-side chamber 422 at an inlet 430 where it can combine with fuel-depleted fluid. While barrier 416 is permeable, its presence assists in directing the fuel-rich fluid to anode 412 rather than cathode 414. The resulting fuel-rich, hydroxyl-rich fluid flows through anode 412 for reaction with its catalyst material. Air or oxygen-containing fluid is supplied to fuel cell 402 by any suitable means, such as a fan or other type or fluid mover. In the illustrated embodiment, air is flowed to an air ingress side of cathode 414 as indicated by arrows 432. A hydrophobic membrane 434 can be provided at the air ingress side that allows air to permeate cathode 414 while preventing the escape of other fluid components such as water. Although not shown in FIG. 8 for convenience but readily understood by persons skilled in the art, anode 412 and cathode 414 electrically communicate with appropriate electrical circuitry, such as electrical leads, busbars, or other interconnects and a desired electrical load such as a battery or a device, motor or machinery requiring an input of electrical energy. Electrons liberated and collected by anode 412 are thus routed in a suitable manner to the load and then supplied to cathode 414 to complete an electrical circuit.

Balance-of-plant apparatus 404 includes means for recirculating fluid back to fuel cell 402, supplying or replenishing fuel, and maintaining fuel concentration to the supply side of anode 412. One or more fuel-processing or separating chambers 440 are provided separately from fuel cell 402. Fuel-processing chamber 440 includes a semipermeable membrane 442 that selectively impedes water while allowing fuel and electrolyte to pass, producing a relatively fuel-rich fluid on the downstream side of this membrane 442. Membrane 442 is just obstructive enough to prevent the fuel-rich fluid from mixing back into the fluid on the upstream side of membrane 442. The fuel-rich fluid enters a conduit and/or manifold 444 at an exit port 446 of fuel-processing chamber 440 and is routed to inlet 430 of anode-side chamber 422. In addition, a fuel supply source 450 is provided with an injector 452 or other discharge means communicating with conduit 444 to supply fresh fuel to fuel cell 402. As indicated by the arrows, post-anode, relatively fuel-depleted fluid collected in fluid collection chamber or manifold 426 enters a conduit and/or manifold 462 and is routed to an inlet port 464 of fuel-processing chamber 440 to membrane 442. As previously noted, membrane 442 separates fuel from the fluid on the upstream side of membrane 442 such that the fuel becomes concentrated on the opposing downstream side. The resulting, even further fuel-depleted, water-rich fluid on the upstream side of membrane 442 is ideal for cathode function, and is recycled back to fuel cell 402 by flowing through an exit port 466 of fuel-processing chamber 440, through a conduit or manifold 468, and to inlet 428 of cathode-side chamber 424. Cathode 414 uses the water to make hydroxyls for the electrolyte. Hydrostatic pressure and other pressure differentials in fuel cell system 400 can be sufficient to maintain relatively continuous flows of fluid through fuel cell system 400. A pump (not shown), however, can be positioned at an appropriate location within fuel cell system 400 if needed or desired. It can be seen in this embodiment that the cathode 414 does not encounter much fuel, and thus the well-known, undesired fuel crossover effect is minimized. In addition, the net fluid flow is in the direction of the hydroxyl diffusion (generally, cathode 414 to anode 412), which increases mass transport.

Figure 9:
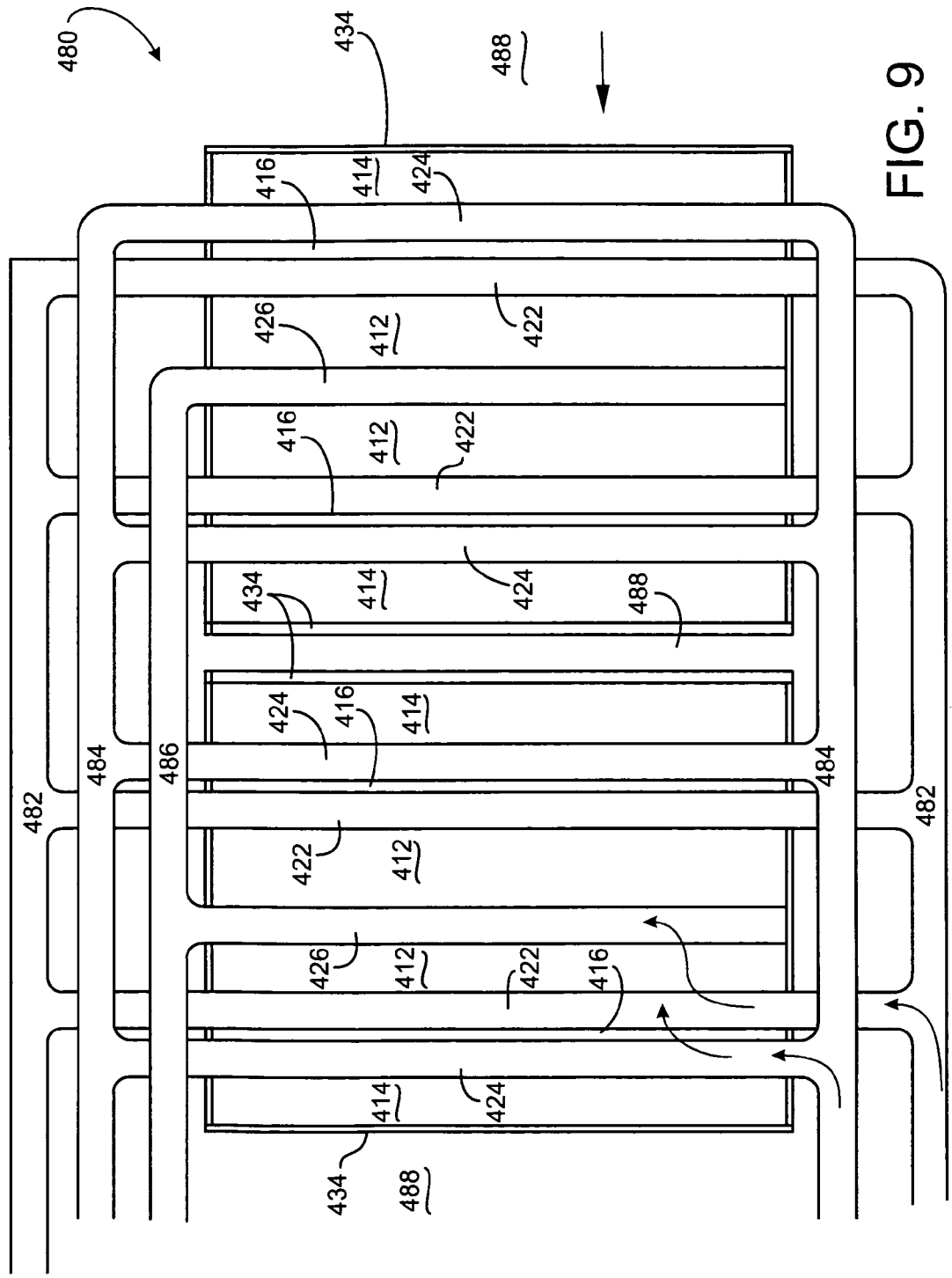
FIG. 9 is a cross-sectional elevation view of a fuel cell stack according to an embodiment of the present disclosure.

FIG. 9 illustrates an example of a fuel cell stack arrangement 480. Fuel cell stack 480 includes a plurality of pairs of anodes 412 and cathodes 414. In the illustrated embodiment, each corresponding anode 412 and cathode 414 is separated by a permeable barrier 416 as described with reference to FIG. 8. It will be understood, however, that any suitable electrode arrangement, including others described herein, can be implemented in fuel cell stack 480. An anode-side chamber 422 is defined between each corresponding anode 412 and barrier 416, and a cathode-side chamber 424 is defined between each corresponding cathode 414 and barrier 416. Fluid collection chambers 426 are provided on the fluid egress sides of anodes 412 to collect post-anode, fuel-depleted fluid. Air-permeable, hydrophobic membranes 434 can be provided at the sides of cathodes 414 through which air passes. High-concentrate fuel mixture is supplied to anode-side chambers 422 via a manifold 482. The source of the high-concentrate fuel mixture can be the fuel-processing chamber 440 illustrated in FIG. 8, downstream of its membrane 442, and/or can be fuel supply source 450 illustrated in FIG. 8. Fluid comprising a lower concentration of fuel and a higher concentration of water is supplied to cathode-side chambers 424 via a manifold 484. The source of the low-fuel, high-water fluid can be the fuel-processing chamber 440 illustrated in FIG. 8, upstream of its membrane 442. The fuel-depleted fluid collected in fluid collection chambers 426 is transported back to balance-of-plant apparatus (e.g., balance-of-plant apparatus 404 in FIG. 8) via a manifold 486. It will be noted from FIG. 9 that the electrode arrangement of fuel cell stack 480 is not limited to anode-cathode, anode-cathode, etc. As illustrated in FIG. 9, the electrode arrangement can be anode-cathode, cathode-anode, anode-cathode, etc. The illustrated electrode arrangement can be advantageous in that it reduces the size of fuel cell stack 480 while increasing the power density of fuel cell stack 480, as well as the number of separate chambers or conduits required and volume of fluid required. For instance, a common collection chamber 426 can be shared by two adjacent anodes 412, and a common air space 488 can be shared by two adjacent cathodes 414.

Figure 10:
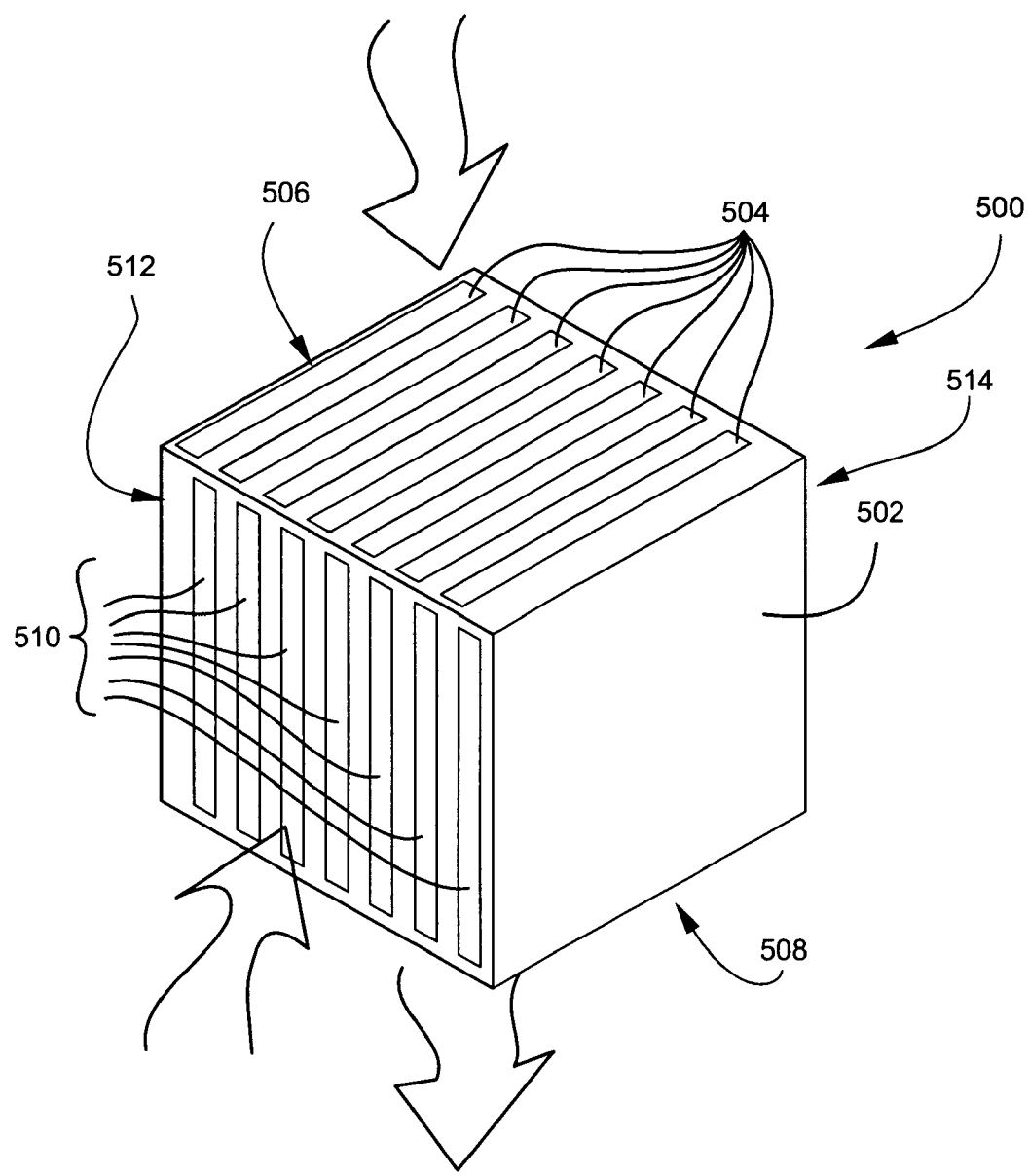
FIG. 10 is a cross-sectional elevation view of a fuel cell stack according to another embodiment.

FIG. 10 illustrates a fuel cell stack 500 according to another embodiment. Fuel cell stack 500 can be housed in a box-like case or housing 502, which can have a cube or other rectilinear shape and be constructed from an inexpensive material such as molded plastic. Construction and materials can be similar to those for the casing of lead acid batteries. Fuel cell stack 500 is constructed from an arrangement of anodes and cathodes (not specifically shown). The electrodes can be arranged as a repetition of the anode-cathode pair illustrated in FIG. 8, or with the anode-cathode-cathode-anode-anode pattern illustrated in FIG. 9, or according to any other suitable arrangement. The anodes and cathodes are edge-sealed to case 502 to define airtight/watertight interposing channels as previously described. Channels for airflow have openings such as slots 504 at an air ingress side 506 of fuel cell stack 500 and opposing openings (not shown) at an air egress side 508. Input air enters case 502 at air ingress side 506 and output air is discharged at air egress side 506. Channels for fuel, electrolyte and/or water flow have openings such as slots 510 at a fluid ingress side 512 of fuel cell stack 500 and opposing openings (not shown) at a fluid egress side 514. Input fluid enters case 502 at fluid ingress side 512 and output fluid is discharged at fluid egress side 514. The net direction of air flow is thus generally transverse to the net direction of fluid flow. Although not specifically shown, the edges of the anodes and cathodes are located on the opposite sides of the portions of case 502 between slots 504 and 510. An alternative embodiment can be readily visualized from FIG. 10 in which fluid ingress proceeds in parallel with fluid egress, i.e., at the same side of case 502, to provide an intrinsic counter-current heat exchanger.

FIG. 11A illustrates one example of a fuel cell system 520 in which the fuel cell stack 500 illustrated in FIG. 10 can operate. It will be understood, however, that many other fuel cell stacks could also operate in fuel cell system 520. A fluid ingress manifold 522 communicates with slots 510 (FIG. 10) at fluid ingress side 512 of fuel cell stack 500 for distribution of fuel-containing fluid to appropriate channels within fuel cell stack 500. Likewise, a fluid egress manifold 524 communicates with slots 510 at fluid egress side 514 of fuel cell stack 500 for removal of fuel-containing fluid from fuel cell stack 500. A fuel processing system (not shown) similar to that illustrated in FIG. 8 (chamber 440) can also be provided in fuel cell system 520 separate from fuel cell stack 500. Fuel cell system 520 further includes a water/thermal/pressure management system 530. In advantageous embodiments, water/thermal/pressure management system 530 includes a conduit 532, at least a portion of which is arranged into a coil for enhancing heat exchanging capability. One or more conduits or manifolds 542 fluidly interconnect conduit 532 with fluid ingress manifold 522 for routing fuel-rich fluid to fuel cell stack 500. Likewise, one or more conduits 544 or manifolds fluidly interconnect conduit 532 with fluid egress manifold 524 for returning fuel-depleted fluid to water/thermal/pressure management system 530. An air manifold 550 communicates with slots 504 (FIG. 10) at air ingress side 506 of fuel cell stack 500. A fan 552 or other fluid mover flows air between the hydrophobic layers of the cathodes. The air flow egresses through an air egress manifold 554 communicating with air egress side 508 of fuel cell stack 500, from which the air passes over the coiled section of conduit 532 of water/thermal/pressure management system 530. It thus can be seen that fuel cell stack provides a very efficient thermal management system. The air flow first cools fuel cell system 520 and then the coiled section of conduit 532. As described further below, water sweats out from conduit 532 and thus is subjected to the airflow and evaporates, and heat is transferred from the interior of conduit 532 by conduction and/or convection, creating a self-regulating thermal control system. Moreover, the product water that transmigrates from conduit 532 can be carried away by the airflow.

FIG. 11B illustrates a cross-sectional view of a section of conduit 532 of water/thermal/pressure management system 530 that is formed by one or more layers (e.g., layers 552 and 554) of material as needed to realize a semipermeable membrane. Generally, the layers employed for the membrane are selected based on application parameters and fuel composition. A combination of hydrophilic and hydrophobic layers may be used. Examples of layers include, but are not limited to, activated nylons, cellulose acetate, nitrocellulose, oleophobic preparations, NAFION™, polyvinyl fluorides, and filtrous materials typically used for water purification. The membrane selectively allows the passage of water from the interior of conduit 532 to the exterior for exposure to airflow while retaining fuel, electrolyte and ionic components within conduit 532, thereby separating and removing the water from the fluid flowing through conduit 532 and increasing the concentration of fuel in the fluid to be returned to fuel cell stack 500 (FIG. 11A). As fluid flows through conduit 532, internal pressure causes a reverse osmosis-like phenomenon wherein water is transpirated through the membrane of conduit 532. This also controls pressure build-up within the fluid circuitry. It thus can be seen that water/thermal/pressure management system 530 provides a simple, compact, elegant and synergistic means for managing water build-up, temperature, pressure, and electrolyte concentration in a self-regulating manner that operates without parasitic energy drains.

FIG. 11C illustrates a more detailed view of the balance-of-apparatus side of fuel cell system 520. As shown in FIG. 11C, a pump 562 can be appropriately positioned in the fluid circuit for assisting in the circulation of fluid through the system if needed or desired. As further shown, fan 552 can alternatively be located on the air egress side of fuel cell stack 500 to pull rather than push air 564 through fuel cell stack 500.

Figure 12:
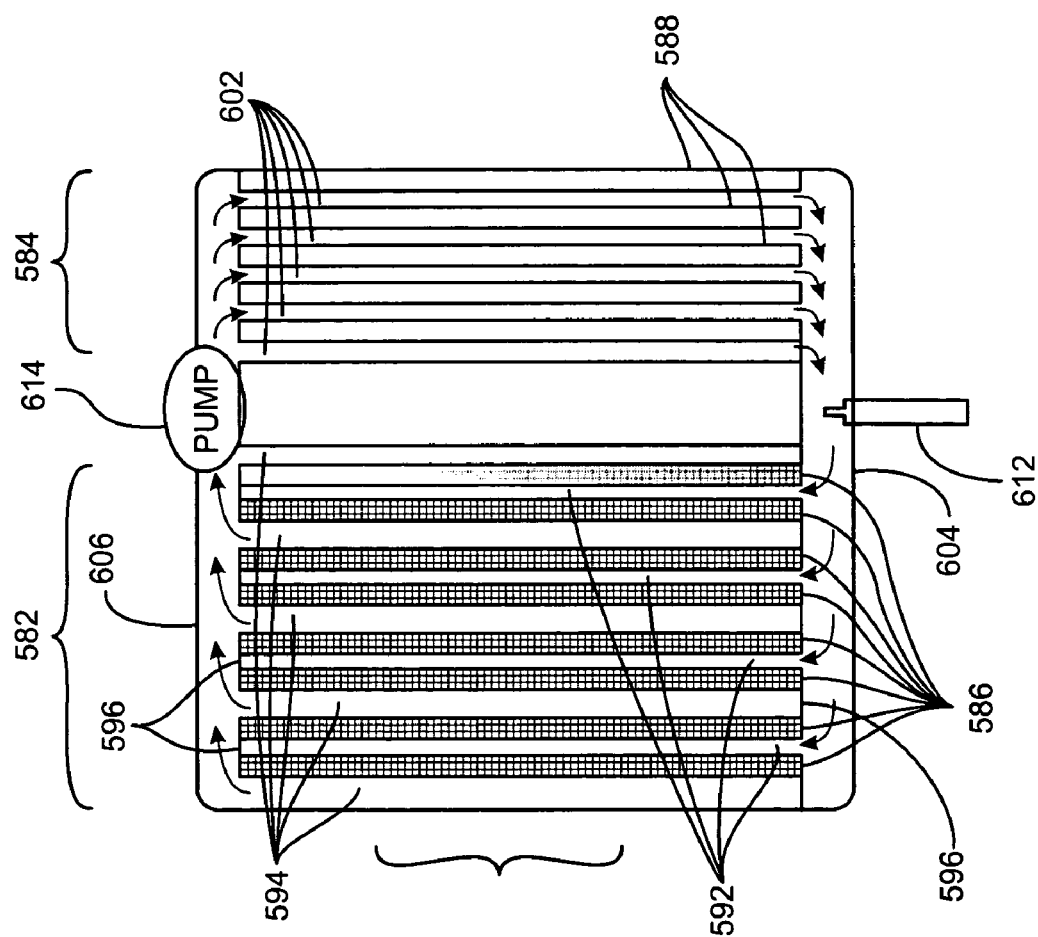
FIG. 12 is a cross-sectional elevation view of a fuel cell stack according to another embodiment.

FIG. 12 illustrates a fuel cell 580 having an electrode stack arrangement according to another embodiment. Fuel cell 580 comprises an anode section 582 and a separate cathode section 584. Anode section 582 comprises a plurality of anodes 586 and cathode section 584 comprises a plurality of cathodes 588. Anodes 586 are grouped together in anode section 582, cathodes 588 are grouped together in cathode section 584, and the groupings are separated from each other. Anodes 586 and cathodes 588 can be respectively arranged as parallel flat plates or as concentric or annular structures. Anodes 586 are separated by anode channels, with each anode channel being adjacent to or otherwise in communication with at least one anode. The anode channels include pre-anode channels 592 and post-anode channels 594. Axial boundaries 596 can span the ends of two or more anodes 586 to direct fluid flow in a desired manner. Cathodes 588 are separated by cathode channels 602, with each cathode channel 602 being adjacent to or otherwise in communication with at least one cathode 588. One or more anode channels 592 and 594 can be in fluid communication with one or more cathode channels 602 by means of manifolds or chambers 604 and 606, respectively. Fuel-rich fluid flows from manifold 604 into pre-anode channels 592 and then passes through anodes 586. Fuel-depleted fluid flows from anodes 586 into post-anode channels 594 and is flowed to cathode channels 602 via manifold 606. One or more injectors 612 can be provided in communication with manifold 604 to supply or replenish fuel to fuel cell 580. The injected fuel can mix with the fluid from cathode section 584 such that a high-concentrate fuel is provided to anode section 582. Air is circulated among cathodes 588 by any means, such as through cathode channels 602 or through additional channels (not shown). As further shown in FIG. 12, a pump 614 can be provided at one or both manifolds 604 or 606 to maintain fluid flow if needed or desired. It will be noted that the number of anodes 586 is different from the number of cathodes 588, such that the total size of anode material is different from the total size of cathode material, and the total flow area in anode channels 592 and 594 is different from the total flow area in cathode channels 602. Varying the number and/or dimensions of the anode material and associated channels in anode section 582 and the cathode material and associated channels in cathode section 584 can be advantageously utilized to tailor the fluid flow dynamics and/or reaction kinetics of fuel cell 580 for a number of purposes, such as maximizing either anode or cathode functionality.

Figure 13:
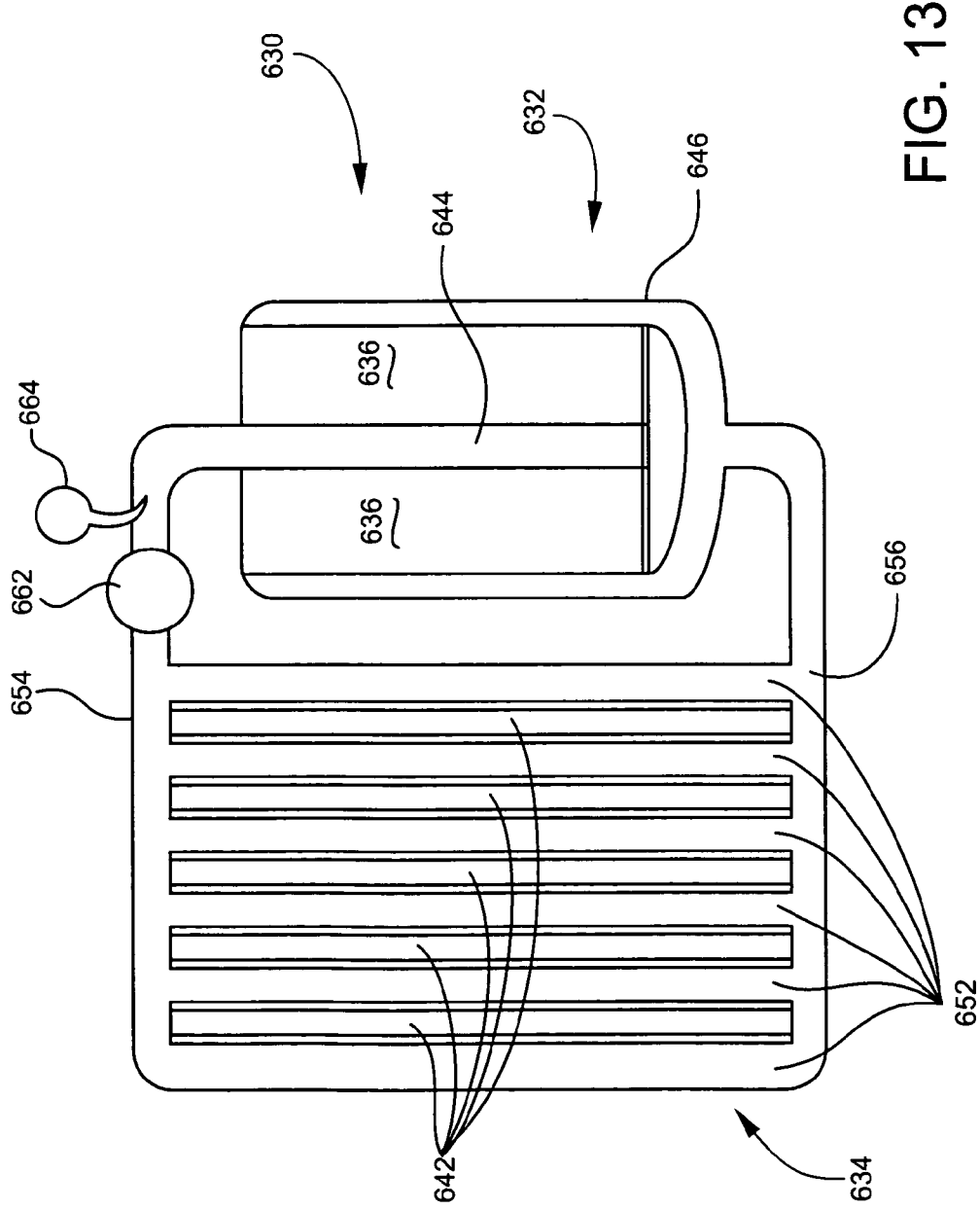
FIG. 13 is a cross-sectional elevation view of a fuel cell stack according to another embodiment.

FIG. 13 illustrates a fuel cell 630 having an electrode stack arrangement according to another embodiment. Fuel cell 630 comprises an anode section 632 and a separate cathode section 634. Anode section 632 comprises one or more anodes or anode regions 636 and cathode section 634 comprises a one or more cathodes or cathode regions 642. Anodes 636 and cathodes 642 can be respectively arranged as parallel flat plates or as concentric or annular structures. In the illustrated example, anode section 632 comprises a relatively low number of anodes 636 that are sized differently than cathodes 642, such as by being shorter and thicker. Anodes 636 are separated by a central, relatively high-flow anode channel 644. An outer anode channel or manifold 646 is disposed on a side of anodes 636 opposite to central anode channel 644. In the illustrated example, fluid flows from central anode channel 644 into anodes 636 and is collected in outer anode channel 646 for transport to cathode section 634. In other implementations, the direction of flow can be the opposite. Similar to the example illustrated in FIG. 12, cathodes 642 are separated by cathode channels 652, with each cathode channel 652 being adjacent to or otherwise in communication with at least one cathode 642. Central anode channel 644 fluidly communicates with one or more cathode channels 652 by means of a manifold 654, and outer anode channel 646 fluidly communicates with one or more cathode channels 652 by means of a manifold 656. A pump 662 and fuel injector 664 can be provided as shown. Additionally, a means (not shown) is provided for supplying air to cathode section 634. This embodiment represents another technique for varying the number and/or dimensions of anode material and channels in anode section 632 and cathode material and channels in cathode section 634 to tailor the fluid flow dynamics and/or reaction kinetics of fuel cell 630.

Figure 14:
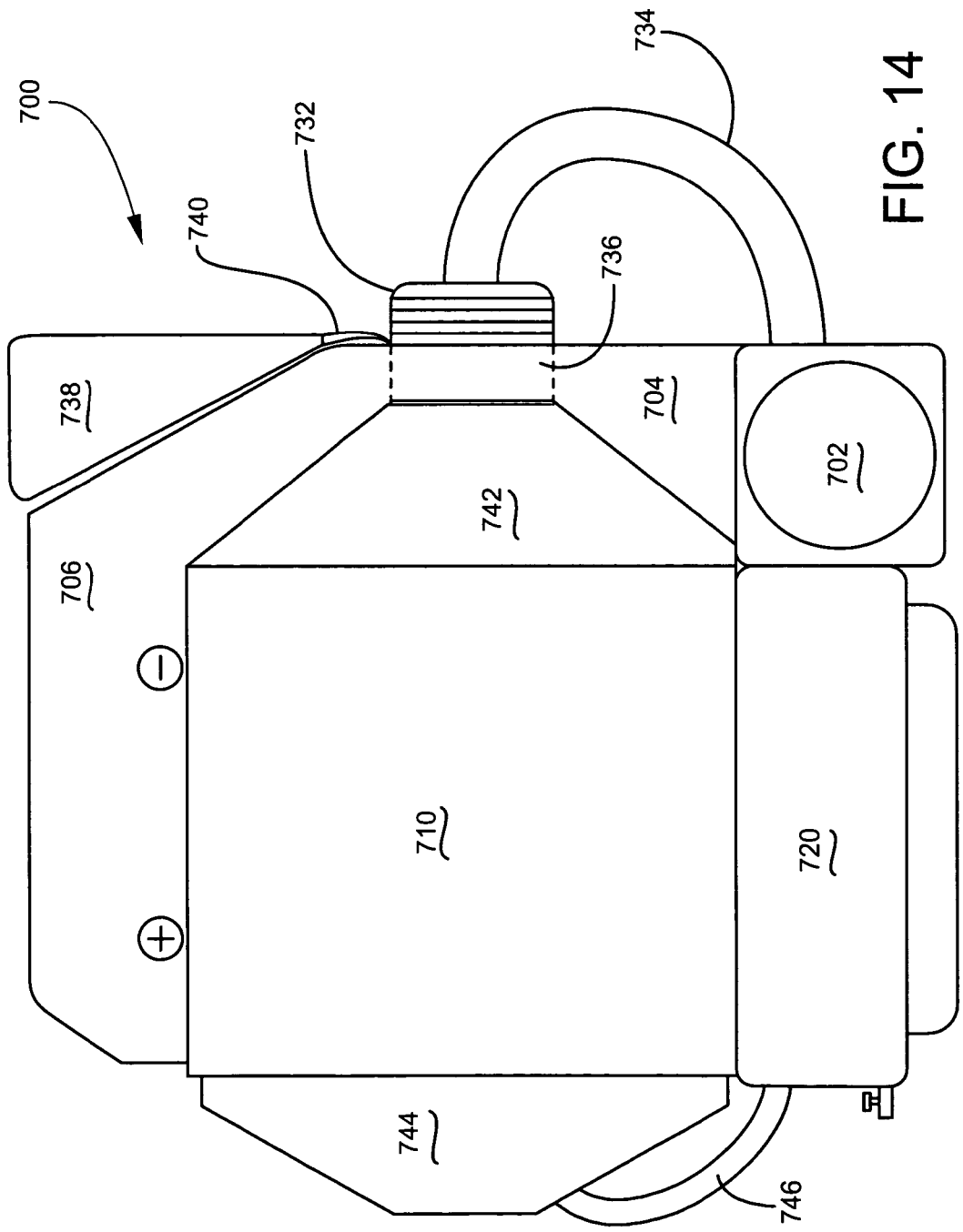
FIG. 14 is a schematic view of a fuel cell system according to another embodiment.

FIG. 14 illustrates a fuel cell system 700 according to another embodiment. A pump 702 circulates both air and the fuel/electrolyte/water fluid combination. Air is flowed through a chamber or manifold portion 704 to another chamber or manifold portion 706, from which the air is flowed through the intra-cathode space of a fuel stack assembly 710. The air then flows over the semipermeable membrane of a water/pressure/thermal management system 720 (see FIGS. 11A-11C and related description). The fluid combination is routed to a pre-cathode assembly 732 via a conduit 734, and is mixed with fresh fuel in a fuel mixing chamber 736. Pre-cathode assembly 732 serves as an additional cathode, and represents another technique for balancing the differential kinetics between the anode and cathode material in a fuel cell. A fuel supply source 738 such as a tank and injector 740 are used to introduce the fresh fuel into fuel mixing chamber 736. The resulting fuel-rich fluid then flows through a fluid input manifold 742 and into the intra-anode space of fuel cell stack assembly 710 and into the anode material. Fuel-depleted fluid is collected in a fluid output manifold 744 and routed to water/pressure/thermal management system 720 via a conduit 746.

The various embodiments of electrodes, fuel cells, and fuel cell systems described thus far offer a number of advantages over conventional designs. These advantages include the following.

Catalyst utilization and efficiency are significantly increased. In all fuel cells, in order for the reactions required for generating electricity to proceed, there needs to be a triple interface of catalyst, fuel and electrolyte. The reaction only occurs at the interface of all three components. If one of these components is not in direct contact with both of the others at the same time, that area will not contribute to the reaction. In the prior art, even under theoretical (and unachievable) ideal conditions, a very significant portion of the catalyst particles may not experience the triple interaction and are therefore wasted. These particles simply do not touch both the fuel and the electrolyte, as is required for the reaction (see, e.g., FIG. 1 and accompanying discussion above).

By contrast, the embodiments disclosed herein implement a flow-through approach that enables the utilization of a fluid-phase electrolyte mixed with fuel rather than a solid electrolyte membrane, thereby enabling the three components of the triple interface to interact universally. The fuel is dissolved into the electrolyte, so both are in continual and complete interfacing. Functionally, every molecule of fuel touches a molecule of electrolyte. The fuel/electrolyte mixture then flows through a porous electrode over a tremendous surface area of active catalyst. In effect, only a double-interface is required, i.e., between the fluid and the catalyst. The reactants are applied to the catalysts with orders of magnitude greater efficiency as compared to conventional technology. The area of triple interface is many times larger than in the prior art, because up to 100% of the surface area can be utilized as much as 100% of the time during operation. Much more of the catalyst on a gram per gram basis is actually used for making electricity. Thus, the subject matter disclosed herein provides not only a much greater amount of useful catalytic surface area, but also essentially every molecule of that catalytic surface area experiences the triple interaction and contributes to the reaction. This is true even though less catalyst may be used than in conventional designs. The increased catalyst surface area boosts the reaction rate, current density, and efficiency of the electrode. Therefore, it is possible to employ less catalyst to obtain more power, and achieve or surpass the goals set forth by the US Department of Energy for fuel cell catalyst loading.

Concentration gradient losses in the electrode are decreased. In conventional designs, as the reactants in the fluid are used and product water is made at an electrode, a relatively reactant-depleted microenvironment forms around the catalyst. This decreases efficiency by limiting catalyst/reactant interaction. This is worsened because relatively dead-end recesses, paired with the lack of flow-through design of the current art, trap inert compounds and waste products. These substances can build up, keeping fuel from the catalyst. The 80% of air that is not oxygen (e.g., nitrogen), inert products in the fuel stream, and even the product water formed on the catalyst can get trapped and block fuel or ions from reaching the catalyst. Collectively this microclimate-scale "gumming up" of the catalyst is termed "concentration gradient loss." By contrast, the flow-through design of embodiments disclosed herein, the surfactant nature of the fuel/electrolyte mixture (which can be enhanced by suitable additives), and oscillating fluid flow all serve to break up concentration gradients before they can form, thereby preserving maximal reaction rates. The oscillating fluid flow can be realized by any appropriate fluid pump capable of this function. One example, although a limitation, is a peristaltic pump. Fluid flow is net forward but oscillates back and forth in small amplitudes in an agitating-like fashion as fluid migrates through the substrate of an electrode. This not only helps mix the fluids but also forces additional reactants to interact with the catalyst during each pass. The net effect is that the reactants encounter much more catalyst area as they pass though the electrode, further increasing efficiency.

Ohmic losses are decreased and thus efficiency gains in electrical conduction are gained over the current art. Conventional designs typically require poorly conducting carbon and nonconducting PTFE components, and thus suffer from a very high internal resistance that saps electrical energy that would otherwise be available for useful work. To partially atone for this, conventional designs have employed field flow plates to serve as current collectors, adding cost and complexity while seriously dropping the power density of the fuel cell. In the embodiments disclosed herein, reduced ohmic losses are achieved by a number of means. First, the base materials and/or coatings employed in the electrodes are excellent conductors. Second, the electrodes do not use binders on a discontinuous substrate. Binders are known to be significant sources of electrical resistance. The internal resistance of the electrodes disclosed herein is greatly reduced. Thus, separate current collectors or field flow plates are not needed, and the electrodes can be edge connected. Incorporating various compounds directly onto or into the microstructure of the electrodes as previously described can further increase conductivity. In general, the embodiments disclosed herein have much less electrical impedance. For present purposes, impedance is the efficiency loss that occurs when electricity has to travel between the interfaces of materials with different conductivities. Impedance is minimal in the embodiments disclosed herein because the charge travels through only similar, intimately connected materials with very large interfaces. It can be further reduced, if desired, by including a small amount of the counter interfacial compound to each layer. Additionally, the embodiments disclosed herein have far fewer electrical junctures, further decreasing impedance.

In addition, the problems attending water balancing are greatly ameliorated or avoided in the systems disclosed herein. Conventional systems are very susceptible to water balance problems. Fuel cell systems typically need to maintain a very specific degree of humidification at various components or locations. If a component such as an electrode becomes too dry or too wet, it can malfunction. This problem is exacerbated because fuel cells operate in changing ambient humidity conditions and encounter frequent temperature fluctuations. Furthermore, water is formed at one electrode, which can flood it, and water is used by and dragged from the other electrode, which can dry it. The conventional PEM membrane is subject to both problems. PEM-based fuel cells seldom function optimally, are quite sensitive to ambient and operating conditions, and require additional, bulky and prohibitively expensive water-handling balance-of-plant equipment. The water-handling equipment electrically parasitizes the fuel cell, dropping efficiency.

By contrast, the systems disclosed herein are not affected by the kinds of water balance problems that plague conventional designs, and provide an inexpensive, simple, non-parasitic means for handling and removing product water while eliminating as much as 70-90% of the balance-of-plant equipment typically required by conventional systems, thereby greatly reducing cost and maintenance while increasing efficiency and power density. An example is the water/thermal/pressure management system 530 described above with reference to FIGS. 11A-11C. In addition, the flow-through design of the systems disclosed herein enables the product water and other by-products such as carbon dioxide to be washed away as it is made. This advantage can be enhanced by the afore-described oscillatory fluid flow and the ability to add detergents, surfactants and the like to the liquid-phase fuel/electrolyte combination. Additionally, because the water makes up a large percentage of the electrolyte mixture, the systems disclosed herein are largely immune from the degree of changes of water concentration that can be deleterious to prior art designs and thus do not require stringent control/regulation over humidification changes. As previously described, excess water can be removed by transpiration, pervaporation and/or evaporation elsewhere from the fuel cell or fuel cell stack with a self-regulating system that does not consume power. Thus, the intrinsic synergies of the systems disclosed herein provide a self-regulating system and obviate the need for most water-handling equipment.

Efficiency losses and dangers attending the well-known fuel crossover effect are reduced in the fuel cells disclosed herein. Generally, crossover is the result of the fact that in typical fuel cell designs some of the fuel can pass the anode without being used for reaction. Crossover is undesirable for at least two reasons. First, the unused fuel represents wasted efficiency and, if not reused or recycled, increased pollution. Second, the crossover fuel can oxidize at the cathode, further dropping efficiency. The embodiments disclosed herein can reduce fuel crossover efficiency losses by a series of features. In embodiments with anode-to-cathode flow direction, a large percentage of the fuel is used in the anode in a "first pass effect." Fuel utilization is augmented by specific flow rates and the previously described oscillating flow. The fuel mixture is brought back and forth across the anode, utilizing a greater percentage of the available fuel, increasing the first pass efficiency. The little fuel that does make it through the anode becomes substantially diluted by the product water made at the anode. In the case of methanol, for every molecule used, five water molecules are made. Any fuel that makes it through the anode hence becomes greatly diluted. As a result of the foregoing, the cathode operates only in a relatively fuel-depleted environment. Additionally, the cathode can include catalysts with selectivity against the anode reaction, reducing crossover efficiency loss. The cathode also may include a number of fuel-excluding technologies described in a separate application.

Regarding the dangers associated with crossover, there is a risk that explosive crossover fuel can mix with oxygen in the electrically charged and heated environment of a fuel cell. This dangerous condition plagues all low-temperature fuel cells. The conventional PEM design employs a large-area membrane to separate the hydrogen from the oxygen. The membrane is paper thin and semipermeable. The gases are hot and pressurized, and create caustic, reactive intermediary compounds that permeate the apparatus. Over time, the membrane can develop leaks that allow mixing of hot pressurized hydrogen and oxygen inside a hot, electrically active environment, potentially creating conditions for an explosion. By contrast, the amount of fuel crossover mixing that occurs in the fuel cells disclosed herein is insignificant is not unsafe or deleterious. Only a small amount of methanol (or other hydrocarbon fuel, if used) evaporates from the cathode and is diluted into the comparatively much greater air volume so that there is minimal combustion risk. Moreover, embodiments disclosed above can employ multiple means of reducing the amount of fuel that gets to and into the cathode. For example, as illustrated for example in FIG. 8, before the fuel mixture enters the fuel cell stack it can be flowed though one or a series of fuel processing devices or separators 440 that serve to channel concentrated fuel to the anode and away from the cathode. In addition, fuel injector feeds fuel into only the anode stream. The product water further dilutes any fuel left in the cathode stream. The cathode experiences a fuel-depleted environment, so very little of the fuel is available for crossover. The potential for fuel crossover is still further limited by the fuel-phobic nature of the materials within the body of the cathode. Very little fuel reaches the cathode, even less penetrates it, and the little that gets through is immediately washed away by such a vastly greater volume of air that it stays orders of magnitude more diluted than its combustible concentration. Finally, because the fuel is in liquid form, it does not mix in the same hazardous way that gases do.

Mass transport losses are decreased in the fuel cells disclosed herein. In conventional designs, the time required for ions to cross the electrolyte membrane causes a significant bottleneck for the electricity-producing reaction. In the fuel cell disclosed herein, however, the improved microstructure of the electrodes enables better conductivity. In addition, the oscillating flow mixes the electrolyte and thereby promotes faster ionic diffusion. Moreover, because of the flow-through design enabling the use of a flowable electrolyte in combination with the fuel, buffers and dibasic compounds can be added to the fluid for releasing additional ions as needed at the appropriate electrode and eliminating localized depletion within the microstructure. Due to the oscillating flow pattern, the net flow washes ions in the proper direction, the mixing agitation increase diffusion rates, and the backward component of flow temporarily increases the concentration of ions and thereby increases diffusion pressure. The oscillating flow and flow-through functions not only increase fuel/catalyst interaction for better fuel utilization and increase the rate of ionic diffusion, but also wash away the product water and reduce the building up of precipitates.

Fuel cell arrangements such as illustrated in FIGS. 5-7, 12 and 13 can be utilized to reduce or eliminate efficiency losses associated with reaction-kinetic mismatches as between anodes and cathodes. Conventional fuel cell stacks, and particularly low-temperature designs, employ equal numbers of anodes and cathodes grouped in functional units of anode/cathode pairs. In many designs, the anode could function at a much higher kinetic rate if it were not limited by the cathode, which often functions at a relatively slower kinetic rate. The differential in kinetics among these electrodes can be a high as two orders of magnitude. Traditionally, this has been compensated for by varying the catalysts loadings as between the anode and cathode.

In the fuel cell arrangements disclosed herein, differential kinetics can be partially or wholly balanced further by employing more than one cathode for every anode (see, e.g., FIGS. 5, 6 and 13) or vice versa (see, e.g., FIG. 12), or more massive cathodes relative to anodes or vice versa (see, e.g., FIGS. 7 and 13). Separating the anodes and cathodes from each other by a distance can facilitate adjusting the relative numbers of anodes and cathodes or their relative sizes, as shown for example in FIGS. 12 and 13. In these latter embodiments, any disadvantage stemming from the increased ion transport distance can be reduced by other advantages provided by the embodiments, such as increased fluid flow rates, the use of hydroxyl-supplying additives, reduction or absence of electrical crossover and fuel crossover, increased fuel and catalyst utilization at the anode, and the ability to maximize each type of electrode's performance (e.g., the shape and size of the substrate structure and of the associated adjacent fluid flow channels) substantially without the need to account for the performance of the other type. The cathode channels employed for fluid flow in FIGS. 12 and 13, respectively, can have a greater total flow volume than the corresponding anode channels. This feature slows the fluid down at the cathode side to compensate for slower reaction rates at the cathodes and hence better balance the system. Because hydroxyls in the systems illustrated in FIGS. 12 and 13 are delivered by fluid flow rather than by diffusion, the anodes can be designed thicker, allowing for wider pores to decrease resistance to flow and increased total surface for greater fuel utilization. A side fluid circuit can be added to recirculate unused fuel leaving the anode.

Many of the various ancillary balance-of-plant components required in conventional systems, especially those employing pressurized gaseous fuel stock, are eliminated in the systems disclosed herein. This is particularly due to the fact that the systems disclosed herein utilize liquid-phase working fluids. There is no need for reformers, shift reactors, fuel processors, high-pressure tanks, field flow/bipolar plates, preheaters, etc.

The embodiments and methods disclosed herein can include means for refreshing the electrolyte. In conventional alkaline fuel cells, the electrolyte slowly reacts with product and ambient $CO_2$ to form an inert product. The most common example of this reaction is:

$$KOH + CO_2 \rightarrow K_2CO_3 + H_2O + \text{heat}$$

This process impedes the proper functioning of a fuel cell in a number of ways. First, the concentration of KOH is lowered, reducing its efficiency as an electrolyte. Second, the dissolved $K_2CO_3$ further dilutes the electrolyte. Third, $K_2CO_3$ precipitates out, potentially gumming up the electrodes. In order to extend maintenance-free intervals of operation, conventional alkaline fuel cells depend on additional balance-of-plant apparatus to "scrub" the $CO_2$, to filter out the $K_2CO_3$, and to replenish the electrolyte.

On the other hand, the embodiments and methods disclosed herein can take advantage of numerous intrinsic synergies to reduce the rate of electrolyte degradation. One way is to not use carbon-based fuels. The systems of the present disclosure are flexible with respect to the range of possible fuels, including fuels that are not carbon-based and therefore do not synthesize $CO_2$. Examples include, but are not limited to, hydrogen and $NaBH_4$. $NaBH_4$ is preferred over hydrogen due to well-known storage, handling and other problems associated with the use of hydrogen. It will be noted, however, that while methanol is a carbon-based fuel, it produces relatively low amounts of $CO_2$. Accordingly, both $NaBH_4$ and methanol are considered to be among the advantageous fuels that can be employed in embodiments and methods disclosed herein.

The process of electrolyte degradation is a reversible reaction that tends toward equilibrium. As the electrolyte goes through its flow cycle, it experiences a wide variation in local conditions. Upstream from the anode, it is relatively concentrated, cool, and has a high fuel load. As it passes through an anode, it is heated, the fuel is depleted, and for every molecule of methanol used, five water molecules dilute it. This drastically alters the concentration, pH, and temperature of the fluid. At the cathode, there is a relative increase of hydroxyls and the water is used up increasing pH and concentration. The electrolyte is also subject to cooling from the mass flow of air at the cathode. In the water-handling chamber as, for example system illustrated in FIGS. 11A-11C, the mixture is further cooled and concentrated. More fuel is then added to the electrolyte downstream.

Some of the local conditions to which the electrolyte-containing fluid is subject favor, or come close to favoring, the reactant side of the above equilibrium. One specific location that can favor the renewal direction of the reaction equilibrium is just downstream from the anode. Here, there is a relative excess of heat and water and relatively low pH and KOH concentrations. At this point, a specific catalyst can be incorporated. Because conditions favor the return reaction, a catalyst here would renew the electrolyte. This catalyst can be included in or near the surface of the egress side of the anode. Solubilizing agents can be added to further tip the equilibrium favorably. In addition, if local conditions do not achieve the ability to favor the renewing direction of the equilibrium, a fraction of or the entire electrolyte can be caused to flow through a side path with a system such as a countercurrent multiplier to augment favorable conditions.

In addition to providing means for refreshing the electrolyte, additional embodiments of the present subject matter incorporate a refresh cycle that cleans the catalysts of poisons. In the refresh cycle, a specific electric charge is forced back through an electrode. Electrical conductors or capacitors can be provided adjacent to or within the structure of the electrodes for this purpose. At the catalyst, a specific amount of oxygen and/or hydrogen is formed, depending on the polarity of the charge. The oxygen physically and chemically frees the catalyst of adherent toxins and thereby refreshes its function. The gas then dissolves or bubbles into the electrolyte and can be removed by the transpiration or venting equipment. The hydrogen can be caused to form at a specific, separate, electrode incorporated for the refresh function for appropriate handling, and may also serve as a cleaning agent. The electricity may be fed to the electrode with positive, negative, or alternating polarity for maximal cleaning/refreshing power with minimal gas production. The oxygen and hydrogen specifically function as cleaning/refreshing agents can also be utilized by the electrodes fuel cell in their traditional oxidizing/reducing roles. In advantageous embodiments, just enough gas is evolved to totally coat the catalyst with minute bubbles. The bubbles are small enough that buoyancy does not overcome the surface tension holding them to the catalyst. At the end of the refresh cycle, the small quantity of gas may dissolve, bubble off, or be reabsorbed at the electrode utilizing the fuel cell's own oxidation-reduction reaction as previously noted. Enough gas can be evolved to purposely cause bubbling of the gas off an electrode.

In some embodiments, the electrodes of the fuel cell are employed to create the hydrogen and oxygen in a unique form of internal reforming. Using specific borohydride fuel, hydrogen is made at the anode and oxygen is made at the cathode. Electricity is used to crack the hydrogen and oxygen out of the fuel stock. Then the hydrogen is consumed to produce water and heat. The net energy output is derived from the difference in enthalpies from cracking the fuel versus that for the hydrogen-to-water reaction.

In advantageous embodiments, the refresh cycle is incorporated into the operation cycle. Extra electrodes are provided in the stack that are rotated through an off/refresh cycle. Each electrode can be switched between a normal mode of operation during which the electrode is employed to generate electricity in its conventional role, and a refresh mode of operation during which the electrode is refreshed by the application of electrical energy to its structure or is employed to apply such energy to another electrode to refresh that other electrode. If, for example, the fuel cell stack design calls for 100 MEA ("membrane electrode assembly") equivalents, the fuel cell according to this embodiment can actually include, for example, 103. Two of the extra electrodes produce the power to clean and refresh the third electrode, while the remaining 100 are operated normally to produce electricity. Once the refresh cycle is completed for a particular electrode, that electrode can then be switched to normal operation while another set of three electrodes are operated in accordance with the refresh cycle to refresh one of the electrodes from the newly selected set. A microprocessor or other suitable electrical controller can be placed in communication with the electrodes of the fuel cell stack to cycle the roles of the electrodes between normal and cleaning modes as the fuel cell operates. This allows the refresh cycle to occur at higher temperatures and prevents build up, ensuring the greatest operation efficiency, while decreasing down-cycle maintenance time. The fuel cell can be caused to run hotter for refresh cycles by limiting the cooling flow or amount of cooling coils in the flow circuit. Alternatively or additionally, the refresh cycle can occur as part of the start-up and/or shut-down procedure or as part of scheduled off-cycle maintenance. Moreover, unlike conventional fuel cell designs, the flow-through embodiments disclosed herein are also amenable to periodically being flushed with specific gas-phase and/or liquid-phase cleaners to refresh the catalysts.

Figure 15:
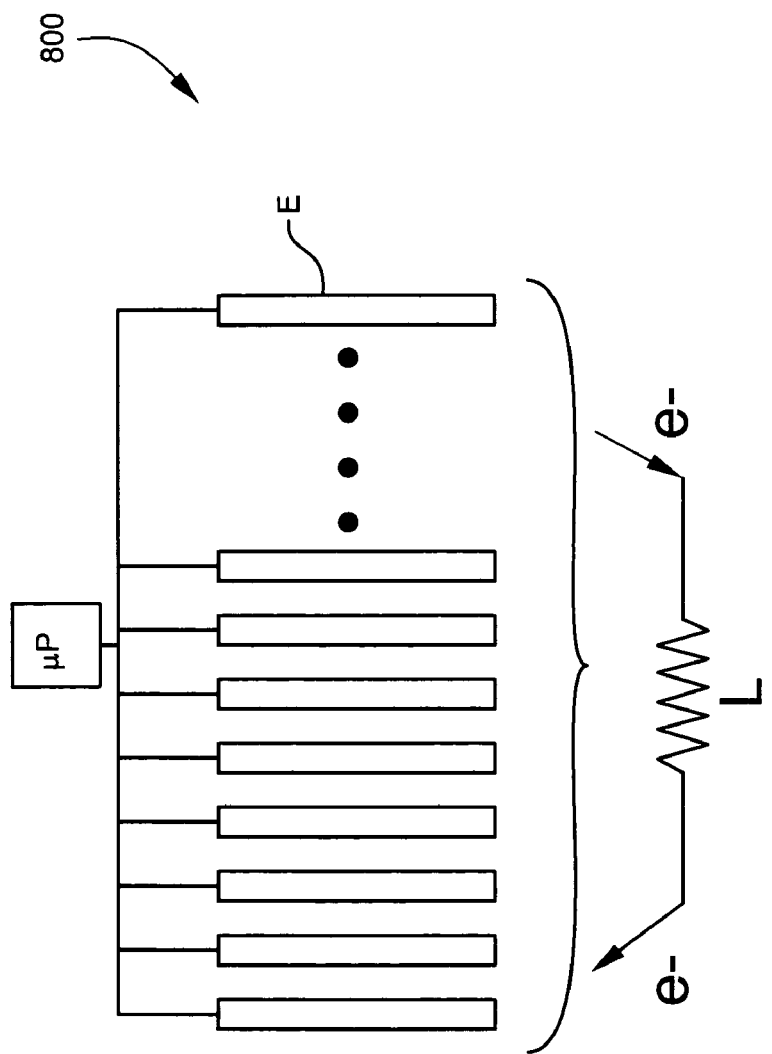
FIG. 15 is a schematic view of a fuel cell according to another embodiment.

An example of one implementation of a refresh cycle is illustrated in the simplified schematic view of FIG. 15. A fuel cell 800 comprises a plurality of electrodes E arranged as anodes and cathodes according to any suitable arrangement. A microprocessor μP or any other suitable electrical controller, as well as associated circuitry, is placed in electrical communication with each electrode E. During normal operation of fuel cell 800, electrodes E generate a current that is routed to an appropriate load L in the ordinary manner of fuel cells. During operation, microprocessor μP can be programmed to switch one or more electrodes E to initiate a refresh cycle, during which time the associated circuitry, which can include a DC voltage source and/or an AC voltage (which may be a waveform generator with adjustable frequency and amplitude), applies electrical energy to the one or more electrodes for the purpose of refreshing a selected electrode E. After the time period for refreshing has elapsed, microprocessor μP can switch the electrode or electrodes E involved in the refresh cycle back to the normal mode of operation and switch another electrode or set of electrodes E to operate the refresh cycle. In this manner, at any given instant of time during operation of fuel cell 800, a desired number of electrodes E are always operating normally to produce the required amount of electricity, while at least one other electrode E is being refreshed by electrical means. Microprocessor μP can be placed in communication with the load side of the electrode arrangement in order to cut off or disconnect a selected one or more electrodes E from load L for a set period of time. In this manner, current collected by an electrode E can be prevented from flowing to load L, whereby charge builds up in the electrode E. Allowing the build-up of charge, even without applying electrical energy to the electrode E, can be sufficient to effect the refresh cycle. The building up of electrical charge within the structure of electrode E can cause poisonous/contaminant components to separate from the catalytic material and be washed away by the fluid flowing through electrode E. The build-up of electrical charge can also cause bubbles to form on the catalyst, physically separating the poisonous/contaminant components from the catalytic material, and can promote the formation of oxygen and hydrogen components that act as cleaning agents.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A flow-through electrode for use in a fuel cell, the electrode comprising:

a porous substrate comprising a first side for fluid ingress, a second side for fluid egress, a plurality of walls oriented in different directions between the first and second sides and defining voids between the walls, the walls including surfaces and micro-scale pores, wherein a multi-directional fluid flow path is defined between the first and second sides; and a thin film disposed on the surfaces, the thin film comprising a catalytic material, whereby a fuel and an electrolyte are flowable generally from the first side, through the voids and the pores of the substrate and in contact with the thin film, and to the second side.

2. The electrode according to claim 1 comprising a conductive component embedded within the substrate for conducting current from the electrode.

3. The electrode according to claim 1 wherein the substrate comprises sintered particles.

4. The electrode according to claim 1 wherein the substrate is formed as a metal sponge.

5. The electrode according to claim 4 wherein the sponge comprises nickel.

6. The electrode according to claim 1 wherein the substrate comprises a microstructure selected from the group consisting of open cellular, reticular, foamed, sintered, sponge, raney, nanostructure, vitreous, gel, sol-gel, aero-gel, and combinations thereof.

7. The electrode according to claim 1 wherein the substrate comprises a material selected from the group consisting of porous conductive plastics, carbon compounds, ceramics, metals, oxides of metals, nitrides or metals, alloys of metals, semiconductors, and combinations thereof.

8. The electrode according to claim 1 comprising microparticles disposed in the voids.

9. The electrode according to claim 8 wherein the microparticles comprise a catalytic material.

10. The electrode according to claim 9 wherein the catalytic material comprises platinum.

11. The electrode according to claim 8 wherein microparticles comprise an electrically conductive material.

12. The electrode according to claim 8 wherein the microparticles comprise a matrix of catalytic material supported on a support material.

13. The electrode according to claim 12 wherein the catalytic material comprises platinum and the support material comprises carbon.

14. The electrode according to claim 12 wherein the catalytic material comprises platinum and the support material comprises nickel.

15. The electrode according to claim 8 wherein the microparticles comprise high-surface area flakes.

16. The electrode according to claim 8 wherein the microparticles comprise filaments.

17. The electrode according to claim 1 comprising three-dimensional structures protruding from the walls into the voids.

18. The electrode according to claim 17 wherein the three-dimensional structures comprise nanostructures.

19. The electrode according to claim 1 wherein the walls have hollow interiors.

20. The electrode according to claim 19 wherein the thin film is further deposited on inside surfaces of the walls facing the interiors.

21. The electrode according to claim 1 wherein the thin film comprises a component selected from the group consisting of platinum, silver, gold, iridium, nickel, palladium, osmium, ruthenium, rhodium, rhenium, tungten, alloys thereof, oxides thereof, and nitrides thereof.

22. The electrode according to claim 1 wherein the thin film is substantially continuous.

23. The electrode according to claim 1 wherein the thin film is discontinuous.

24. The electrode according to claim 1 comprising a semi-permeable membrane disposed at a side of the substrate, the membrane comprising material substantially permeable to water and electrolyte and substantially impermeable to fuel.

25. The electrode according to claim 1 comprising a semi-permeable membrane disposed at a side of the substrate, the membrane comprising a material substantially permeable to fuel and electrolyte and substantially impermeable to water.

26. The electrode according to claim 1 comprising a semi-permeable membrane disposed at a side of the substrate, the membrane comprising a material substantially permeable to fuel and substantially impermeable to electrolyte and water.

27. A flow-through electrode for use in a fuel cell, the electrode comprising:
(a) a first region and a second region each comprising a porous substrate for flowing a fuel/electrolyte combination therethrough and a thin film disposed on the substrate, the thin film comprising a catalytic material; and
(b) a third region interposed between the first and second regions and fluidly communicating with the first and second regions, wherein the pore density of the third region is less than the pore densities of the first and second regions.

28. The electrode according to claim 27 wherein the first and second regions are part of a contiguous substrate.

29. The electrode according to claim 27 wherein the third region is substantially hollow.

30. The electrode according to claim 27 wherein each substrate comprises a plurality of walls oriented in different directions and a plurality of voids between the walls, the walls include surfaces and micro-scale pores, and the thin film is disposed on the surfaces.

31. A flow-through electrode for use in a fuel cell, the electrode comprising a plurality of regions, each region adjacent to and fluidly communicating with at least one other region, each region comprising a porous substrate for flowing a fuel/electrolyte combination therethrough and a thin film disposed on the substrate, the thin film comprising a catalytic material, and each region having a porosity different from the porosities of the other regions, wherein the plurality of regions are arranged in order of successively increasing porosity to define a porosity gradient whereby the fuel/electrolyte combination can be flowed generally with or against the porosity gradient.

32. The electrode according to claim 31 wherein each substrate comprises a plurality of walls oriented in different directions and a plurality of voids between the walls, the walls include surfaces and micro-scale pores, and the thin film is disposed on the surfaces.

33. A fuel cell comprising:
(a) an anode comprising a porous substrate and a thin film disposed on the substrate, the thin film comprising a catalytic material;
(b) a cathode;
(c) a porous barrier interposed between the anode and cathode;
(d) an anode-side channel defined between the anode and barrier for receiving a fuel-rich fluid; and
(e) a cathode-side channel defined between the cathode and barrier for receiving a fuel-depleted fluid.

34. The fuel cell according to claim 33 wherein the substrate comprises a plurality of walls oriented in different directions and a plurality of voids between the walls, the walls include surfaces and micro-scale pores, and the thin film is disposed on the surfaces.

35. The fuel cell according to claim 33 comprising a separator device communicating with the anode-channel and the cathode-side channel for separating fuel from a fluid processed by the anode.

36. A fuel cell comprising:
(a) an anode comprising a first anode section, a second anode section and a third anode section, the first and second anode sections each comprising a porous substrate for flowing a fuel/electrolyte combination therethrough, and the third anode section interposed between the first and second anode sections and fluidly communicating with the first and second anode sections;
(b) a cathode comprising a first cathode section and a second cathode section;
(c) a first channel interposed between the first anode section and the first cathode section; and
(d) a second channel interposed between the second anode section and the second cathode section.

37. The fuel cell according to claim 36 wherein the first and second anode sections are part of a contiguous substrate.

38. The fuel cell according to claim 36 wherein the pore density of the third anode section is less than the pore densities of the first and second anode sections.

39. The fuel cell according to claim 36 wherein the anode comprises a porous substrate and a thin film disposed on the substrate, and the thin film comprises a catalytic material.

40. The electrode according to claim 39 wherein the substrate comprises a plurality of walls oriented in different directions and a plurality of voids between the walls, the walls include surfaces and micro-scale pores, and the thin film is disposed on the surfaces.

41. A fuel cell stack comprising:
(a) a first side, a second side opposing the first side, a third side, and a fourth side opposing the third side;
(b) a plurality of substantially planar electrodes arranged substantially parallel to each other and comprising respective edges defining the first, second, third, and fourth sides, the plurality of electrodes defining a plurality of first channels fluidly communicating with the first and second sides for conducting an oxygen-containing fluid generally from the first side to the second side, and defining a plurality of second channels fluidly communicating with the third and fourth sides for conducting a fuel/electrolyte combination generally from the third side to the fourth side; and
(c) a device fluidly communicating with the second channels for removing water from the fuel/electrolyte combination by a pressure differential.

42. The fuel cell stack according to claim 41 wherein the plurality of electrodes include anodes and cathodes, and at least one channel is interposed between and fluidly communicates with at least two anodes.

43. The fuel cell stack according to claim 41 wherein the device comprises a conduit comprising a semipermeable wall for permitting transpiration of water from the conduit and retention of fuel and electrolyte components within the conduit.

44. The fuel cell stack according to claim 41 wherein the device comprises a conduit comprising a semipermeable wall for permitting transpiration of fuel and electrolyte components from the conduit and retention of water within the conduit.

45. The fuel cell stack according to claim 41 comprising a device fluidly communicating with the second channels for removing heat from the fuel/electrolyte combination.

46. A fuel cell comprising:
(a) an anode region comprising a plurality of anodes and a plurality of anode channels, each anode channel communicating with at least one anode, the plurality of anode channels comprising pre-anode channels for supplying a fuel-rich fluid to one or more of the anodes and post-anode channels for receiving a fuel-depleted fluid from one or more of the anodes; and
(b) a cathode region comprising a plurality of cathodes and a plurality of cathode channels, each cathode channel communicating with at least one cathode and at least one anode channel.

47. The fuel cell according to claim 46 wherein the number of anodes is different from the number of cathodes.

48. The fuel cell according to claim 46 comprising a manifold communicating with the anode channels and the cathode channels for transferring electrolyte.

49. The fuel cell according to claim 48 comprising a device fluidly communicating with the manifold for removing water from the fuel-depleted fluid by a pressure differential.

50. The fuel cell according to claim 49 wherein the device comprises a conduit comprising a semipermeable wall for permitting transpiration of water from the conduit and retention of fuel and electrolyte components within the conduit.

51. A fuel cell comprising:
(a) an anode section comprising a first anode, a second anode and an anode channel interposed between and fluidly communicating with the first and second anodes, the first and second anodes each comprising a porous substrate for flowing a fuel/electrolyte combination therethrough; and
(b) a cathode section comprising a plurality of cathodes and a plurality of cathode channels, each cathode channel communicating with at least one cathode, and the plurality of cathode channels spaced from and communicating with the anode section.

52. The fuel cell according to claim 51 comprising a device fluidly communicating with the anode section for removing water from the fuel/electrolyte combination by a pressure differential.

53. The fuel cell according to claim 52 wherein the device comprises a conduit comprising a semipermeable wall for permitting transpiration of water from the conduit and retention of fuel and electrolyte components within the conduit.

54. A method for operating a fuel cell comprising:
(a) providing a flow-through electrode comprising a porous substrate and a catalyst disposed on the substrate; and
(b) flowing a fluid through the electrode, the fluid comprising an alkali electrolyte and an additive for supplying a supplemental source of hydroxyl ions.

55. The method according to claim 54 wherein the hydroxyl-supplying additive is selected from the group consisting of buffers, polyhydroxyl alkalis, hydroxyl carriers, and combinations thereof.

56. The method according to claim 54 wherein the fluid further comprises an additive for cleaning the electrolyte.

57. The method according to claim 54 wherein the alkali electrolyte comprises a metal hydroxide.

58. The method according to claim 54 wherein flowing the fluid comprises flowing the fluid in a net forward direction that includes oscillatory components.

59. A method for operating a fuel cell comprising:
(a) operating a plurality of electrodes comprising anodes and cathodes to collect electrons from the anodes;
(b) switching the operation of at least one electrode to a refresh cycle whereby catalyst supported by the electrode is cleaned, wherein switching comprises disconnecting the at least one electrode from an electron-receiving load; and
(c) applying an electric charge to one or more electrodes including the disconnected electrode.

60. The method according to claim 59 comprising operating the at least one electrode in an electron-collecting cycle after cleaning the at least one electrode, and switching the operation of at least one other electrode to the refresh cycle.

61. The method according to claim 59 comprising operating an electrical controller to switch one or more electrodes between an electron-collecting cycle and a refresh cycle.

62. The method according to claim 59 comprising flowing an electrolyte-containing fluid through at least one of the electrodes in a net forward direction that includes oscillatory components.

63. The method according to claim 59 comprising flowing an electrolyte-containing fluid through the electrodes including the at least one electrode being refreshed.

64. A fuel cell comprising:
   (a) an anode;
   (b) a cathode;
   (c) a porous barrier interposed between the anode and cathode;
   (d) an anode-side channel defined between the anode and barrier for receiving a fuel-rich fluid; and
   (e) a cathode-side channel defined between the cathode and barrier for receiving a fuel-depleted fluid; and
   (f) a separator device communicating with the anode-channel and the cathode-side channel for separating fuel from a fluid processed by the anode.

65. The fuel cell according to claim 64 wherein the anode comprises a porous substrate and a thin film disposed on the substrate, and the thin film comprises a catalytic material.

66. The fuel cell according to claim 65 wherein the substrate comprises a plurality of walls oriented in different directions and a plurality of voids between the walls, the walls include surfaces and micro-scale pores, and the thin film is disposed on the surfaces.

67. A fuel cell stack comprising:
   (a) a first side, a second side opposing the first side, a third side, and a fourth side opposing the third side;
   (b) a plurality of substantially planar electrodes arranged substantially parallel to each other and comprising respective edges defining the first, second, third, and fourth sides, the plurality of electrodes defining a plurality of first channels fluidly communicating with the first and second sides for conducting an oxygen-containing fluid generally from the first side to the second side, and defining a plurality of second channels fluidly communicating with the third and fourth sides for conducting a fuel/electrolyte combination generally from the third side to the fourth side; and
   (c) a device fluidly communicating with the second channels for removing heat from the fuel/electrolyte combination.

68. The fuel cell stack according to claim 67 wherein the plurality of electrodes include anodes and cathodes, and at least one channel is interposed between and fluidly communicates with at least two anodes.

69. The fuel cell stack according to claim 67 comprising a device fluidly communicating with the second channels for removing water from the fuel/electrolyte combination by a pressure differential.

70. The fuel cell stack according to claim 69 wherein the device comprises a conduit comprising a semipermeable wall for permitting transpiration of water from the conduit and retention of fuel and electrolyte components within the conduit.

71. The fuel cell stack according to claim 69 wherein the device comprises a conduit comprising a semipermeable wall for permitting transpiration of fuel and electrolyte components from the conduit and retention of water within the conduit.

72. A method for operating a fuel cell comprising:
   (a) providing a flow-through electrode comprising a porous substrate and a catalyst disposed on the substrate; and
   (b) flowing a fluid through the electrode, the fluid comprising an alkali electrolyte and an additive for cleaning the electrolyte.

73. The method according to claim 72 wherein the fluid further comprises an additive for supplying a supplemental source of hydroxyl ions.

74. The method according to claim 73 wherein the hydroxyl-supplying additive is selected from the group consisting of buffers, polyhydroxyl alkalis, hydroxyl carriers, and combinations thereof.

75. The method according to claim 72 wherein the alkali electrolyte comprises a metal hydroxide.

76. The method according to claim 72 wherein flowing the fluid comprises flowing the fluid in a net forward direction that includes oscillatory components.

77. A method for operating a fuel cell comprising:
   (a) providing a flow-through electrode comprising a porous substrate and a catalyst disposed on the substrate; and
   (b) flowing a fluid through the electrode in a net forward direction that includes oscillatory components, the fluid comprising an alkali electrolyte.

78. The method according to claim 77 wherein the fluid further comprises an additive for supplying a supplemental source of hydroxyl ions.

79. The method according to claim 78 wherein the hydroxyl-supplying additive is selected from the group consisting of buffers, polyhydroxyl alkalis, hydroxyl carriers, and combinations thereof.

80. The method according to claim 77 wherein the fluid further comprises an additive for cleaning the electrolyte.

81. The method according to claim 77 wherein the alkali electrolyte comprises a metal hydroxide.

82. A method for operating a fuel cell comprising:
   (a) operating a plurality of electrodes comprising anodes and cathodes to collect electrons from the anodes;
   (b) switching the operation of at least one electrode to a refresh cycle whereby catalyst supported by the electrode is cleaned; and
   (c) applying an electric charge to one or more electrodes whereby at least one of these electrodes undergoes the refresh cycle.

83. The method according to claim 82 wherein switching comprises disconnecting the at least one electrode from an electron-receiving load.

84. The method according to claim 83 wherein applying includes applying an electric charge to the disconnected electrode.

85. The method according to claim 82 comprising operating the at least one electrode in an electron-collecting cycle after cleaning the at least one electrode, and switching the operation of at least one other electrode to the refresh cycle.

86. The method according to claim 82 comprising operating an electrical controller to switch one or more electrodes between an electron-collecting cycle and a refresh cycle.

87. The method according to claim 82 comprising flowing an electrolyte-containing fluid through at least one of the electrodes in a net forward direction that includes oscillatory components.

88. The method according to claim 82 comprising flowing an electrolyte-containing fluid through the electrodes including the at least one electrode being refreshed.

89. A method for operating a fuel cell comprising:
   (a) operating a plurality of electrodes comprising anodes and cathodes to collect electrons from the anodes;

(b) switching the operation of at least one electrode to a refresh cycle whereby catalyst supported by the electrode is cleaned;

(c) operating the at least one electrode in an electron-collecting cycle after cleaning the at least one electrode; and (d) switching the operation of at least one other electrode to the refresh cycle.

90. The according to claim 89 wherein switching the operation of the at least one electrode comprises disconnecting the at least one electrode from an electron-receiving load.

91. The method according to claim 90 comprising applying an electric charge to one or more electrodes including the disconnected electrode.

92. The method according to claim 89 comprising applying an electric charge to one or more electrodes whereby at least one of these electrodes undergoes the refresh cycle.

93. The method according to claim 89 comprising operating an electrical controller to switch one or more electrodes between an electron-collecting cycle and a refresh cycle.

94. The method according to claim 89 comprising flowing an electrolyte-containing fluid through at least one of the electrodes in a net forward direction that includes oscillatory components.

95. The method according to claim 89 comprising flowing an electrolyte-containing fluid through the electrodes including the at least one electrode being refreshed.

96. A method for operating a fuel cell comprising:

(a) operating a plurality of electrodes comprising anodes and cathodes to collect electrons from the anodes;

(b) switching the operation of at least one electrode to a refresh cycle whereby catalyst supported by the electrode is cleaned; and (c) flowing an electrolyte-containing fluid through at least one of the electrodes in a net forward direction that includes oscillatory components.

97. The method according to claim 96 wherein switching comprises disconnecting the at least one electrode from an electron-receiving load.

98. The method according to claim 97 comprising applying an electric charge to one or more electrodes including the disconnected electrode.

99. The method according to claim 96 comprising applying an electric charge to one or more electrodes whereby at least one of these electrodes undergoes the refresh cycle.

100. The method according to claim 96 comprising operating the at least one electrode in an electron-collecting cycle after cleaning the at least one electrode, and switching the operation of at least one other electrode to the refresh cycle.

101. The method according to claim 96 comprising operating an electrical controller to switch one or more electrodes between an electron-collecting cycle and a refresh cycle.

102. The method according to claim 96 comprising flowing an electrolyte-containing fluid through the electrodes including the at least one electrode being refreshed.

103. A method for operating a fuel cell comprising:

(a) operating a plurality of electrodes comprising anodes and cathodes to collect electrons from the anodes;

(b) switching the operation of at least one electrode to a refresh cycle whereby catalyst supported by the electrode is cleaned; and (c) flowing an electrolyte-containing fluid through the electrodes including the at least one electrode being refreshed.

104. The method according to claim 103 wherein switching comprises disconnecting the at least one electrode from an electron-receiving load.

105. The method according to claim 104 comprising applying an electric charge to one or more electrodes including the disconnected electrode.

106. The method according to claim 103 comprising applying an electric charge to one or more electrode whereby at least one of these electrodes undergoes the refresh cycle.

107. The method according to claim 103 comprising operating the at least one electrode in an electron-collecting cycle after cleaning the at least one electrode, and switching the operation of at least one other electrode to the refresh cycle.

108. The method according to claim 103 comprising operating an electrical controller to switch one or more electrodes between an electron-collecting cycle and a refresh cycle.

109. The method according to claim 103 comprising flowing an electrolyte-containing fluid through at least one of the electrodes in a net forward direction that includes oscillatory components.

* * * * *